(12) United States Patent
Washio et al.

(10) Patent No.: US 10,816,700 B2
(45) Date of Patent: Oct. 27, 2020

(54) HARD COAT LAYERED FILM

(71) Applicant: RIKEN TECHNOS CORPORATION, Tokyo (JP)

(72) Inventors: Nozomu Washio, Tokyo (JP); Taketo Hashimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 156 days.

(21) Appl. No.: 16/060,793

(22) PCT Filed: Nov. 25, 2016

(86) PCT No.: PCT/JP2016/084981
§ 371 (c)(1),
(2) Date: Jun. 8, 2018

(87) PCT Pub. No.: WO2017/098935
PCT Pub. Date: Jun. 15, 2017

(65) Prior Publication Data
US 2018/0372921 A1    Dec. 27, 2018

(30) Foreign Application Priority Data

Dec. 8, 2015   (JP) ................................ 2015-239074

(51) Int. Cl.
| | | |
|---|---|---|
| B32B 27/18 | (2006.01) | |
| B32B 27/30 | (2006.01) | |
| B32B 27/08 | (2006.01) | |
| C09D 5/00 | (2006.01) | |
| G02B 1/14 | (2015.01) | |
| G02B 1/18 | (2015.01) | |
| C09D 7/40 | (2018.01) | |
| C08J 7/04 | (2020.01) | |
| C09D 133/10 | (2006.01) | |

(52) U.S. Cl.
CPC ................ *G02B 1/14* (2015.01); *B32B 27/18* (2013.01); *B32B 27/30* (2013.01); *C08J 7/042* (2013.01); *C09D 5/00* (2013.01); *C09D 7/40* (2018.01); *C09D 7/67* (2018.01); *C09D 7/68* (2018.01); *C09D 133/10* (2013.01); *G02B 1/18* (2015.01); *C08J 2333/14* (2013.01)

(58) Field of Classification Search
None
See application file for complete search history.

(56) References Cited

U.S. PATENT DOCUMENTS

| | | | |
|---|---|---|---|
| 3,496,143 A | 2/1970 | Siggel et al. | |
| 6,055,823 A | 5/2000 | Baker et al. | |
| 6,489,015 B1 | 12/2002 | Tsuchiya et al. | |
| 10,596,739 B2 | 3/2020 | Washio et al. | |
| 2005/0249942 A1 | 11/2005 | Coggio et al. | |
| 2006/0134400 A1 | 6/2006 | Takada et al. | |
| 2006/0210727 A1 | 9/2006 | Ibuki et al. | |
| 2007/0231566 A1 | 10/2007 | Yoneyama et al. | |
| 2007/0291363 A1 | 12/2007 | Asakura et al. | |
| 2010/0147191 A1 | 6/2010 | Sakano et al. | |
| 2010/0210812 A1 | 8/2010 | Urakawa et al. | |
| 2012/0114892 A1 | 5/2012 | Jung et al. | |
| 2013/0059158 A1 | 3/2013 | Oguro et al. | |
| 2013/0084458 A1 | 4/2013 | Yamada et al. | |
| 2013/0222906 A1 | 8/2013 | Tsunekawa et al. | |
| 2014/0044891 A1 | 2/2014 | Shibata et al. | |
| 2014/0208657 A1 | 7/2014 | Kim et al. | |
| 2014/0227482 A1 | 8/2014 | Shibata et al. | |
| 2014/0360975 A1 | 12/2014 | Hustad et al. | |
| 2015/0203711 A1 | 7/2015 | Kang et al. | |
| 2016/0122525 A1 | 5/2016 | Carloff et al. | |
| 2016/0122573 A1 | 5/2016 | Uprety et al. | |
| 2016/0229159 A1* | 8/2016 | Nakashima | ............. B32B 27/08 |
| 2017/0095993 A1 | 4/2017 | Tomomatsu et al. | |
| 2017/0183543 A1 | 6/2017 | Nagata et al. | |

(Continued)

FOREIGN PATENT DOCUMENTS

| | | |
|---|---|---|
| CN | 103492913 A | 1/2014 |
| CN | 104422239 A | 3/2015 |

(Continued)

OTHER PUBLICATIONS

CN201680015900.0 Office Action dated Sep. 10, 2019, 13 pgs.
TW105104907 Office Action dated Oct. 18, 2019; 10 pages.
TW105104240 Office Action dated Oct. 17, 2019, 10 pgs.
PCT/JP2017/040099 International Search Report dated Feb. 13, 2018; 4 pgs.
CN201680015984.8 Office Action dated Nov. 5, 2018; 13 pgs.
TW105104026 Office Action dated Oct. 5, 2019; 10 pgs.
CN201680015901.5 Office Action dated Jan. 28, 2019; 12 pgs.
TW105104027 Office Action dated Jun. 25, 2019; 21 pages.
CN201680015902.X Office Action dated Feb. 3, 2019; 15 pgs.

(Continued)

*Primary Examiner* — Sheeba Ahmed
(74) *Attorney, Agent, or Firm* — Bracewell LLP; Brad Y. Chin

(57) ABSTRACT

Embodiments provide a hard coat layered film having a first hard coat, a second hard coat, and a transparent resin film layer in order from an outer layer side, the first hard coat including (A) 100 parts by mass of a polyfunctional (meth) acrylate including 20% by mass or more of a tripentaerythritol acrylate, (B) 0.01-7 parts by mass of a water repellent, and (C) 0.01-10 parts by mass of a silane coupling agent, the first hard coat being formed from a coating material not including inorganic particles, and the second hard coat including (A') 100 parts by mass of a polyfunctional (meth) acrylate and (D) 50-300 parts by mass of inorganic fine particles having an average particle diameter of 1-300 nm. According to at least one embodiment, component (A) may be a mixture of tripentaerythritol acrylate and one or more species selected from the group consisting of dipentaerythritol acrylate, monopentaerythritol acrylate, and polypentaerythritol acrylate.

14 Claims, 2 Drawing Sheets

(56) References Cited

U.S. PATENT DOCUMENTS

| | | | |
|---|---|---|---|
| 2017/0198164 A1 | 7/2017 | Itagaki et al. | |
| 2018/0072029 A1* | 3/2018 | Nakashima | C09D 7/40 |

FOREIGN PATENT DOCUMENTS

| | | |
|---|---|---|
| EP | 2873692 A1 | 5/2015 |
| JP | S633011 A | 1/1988 |
| JP | H0211665 A | 1/1990 |
| JP | H0419142 A | 1/1992 |
| JP | H0794061 A | 4/1995 |
| JP | 2000052472 A | 2/2000 |
| JP | 2000190430 A | 7/2000 |
| JP | 2000214791 A | 8/2000 |
| JP | 2000517455 A | 12/2000 |
| JP | 2002062405 A | 2/2002 |
| JP | 2006058574 A | 3/2006 |
| JP | 2006215488 A | 8/2006 |
| JP | 2007537059 A | 12/2007 |
| JP | 2008026883 A | 2/2008 |
| JP | 2008095064 A | 4/2008 |
| JP | 2008201864 A | 9/2008 |
| JP | 2008538195 A | 10/2008 |
| JP | 2009114248 A | 5/2009 |
| JP | 2009196125 A | 9/2009 |
| JP | 2009279806 A | 12/2009 |
| JP | 2010064332 A | 2/2010 |
| JP | 2010054861 A | 3/2010 |
| JP | 2010060190 A | 3/2010 |
| JP | 2010064332 A | 3/2010 |
| JP | 2010078642 A | 4/2010 |
| JP | 2010511206 A | 4/2010 |
| JP | 2010131771 A | 6/2010 |
| JP | 2010208035 A | 9/2010 |
| JP | 2010211150 A | 9/2010 |
| JP | 2010224150 A | 10/2010 |
| JP | 2010241019 A | 10/2010 |
| JP | 2010271400 A | 12/2010 |
| JP | 2010275385 A | 12/2010 |
| JP | 2011032350 A | 2/2011 |
| JP | 2011037927 A | 2/2011 |
| JP | 2011512422 A | 4/2011 |
| JP | 2011128439 A | 6/2011 |
| JP | 2011133862 A | 7/2011 |
| JP | 2011175040 A | 9/2011 |
| JP | 2011201087 A | 10/2011 |
| JP | 2011213989 A | 10/2011 |
| JP | 2012062385 A | 3/2012 |
| JP | 2012111943 A | 6/2012 |
| JP | 2012234163 A | 11/2012 |
| JP | 2012250438 A | 12/2012 |
| JP | 2013075466 A | 4/2013 |
| JP | 2013076029 A | 4/2013 |
| JP | 2013142113 A | 7/2013 |
| JP | 2013173871 A | 9/2013 |
| JP | 201431397 A | 2/2014 |
| JP | 2014024332 A | 2/2014 |
| JP | 2014025061 A | 2/2014 |
| JP | 2014040017 A | 3/2014 |
| JP | 2014043101 A | 3/2014 |
| JP | 2014062709 A | 4/2014 |
| JP | 2014080536 A | 5/2014 |
| JP | 2014117904 A | 6/2014 |
| JP | 2014143831 A | 8/2014 |
| JP | 2014152237 A | 8/2014 |
| JP | 2014201681 A | 10/2014 |
| JP | 2014238614 A | 12/2014 |
| JP | 2015013472 A | 1/2015 |
| JP | 2015013473 A | 1/2015 |
| JP | 2015016683 A | 1/2015 |
| JP | 2015033851 A | 2/2015 |
| JP | 2015034285 A | 2/2015 |
| JP | 2015034286 A | 2/2015 |
| JP | 2015083370 * | 4/2015 |
| JP | 2015083370 A | 4/2015 |
| JP | 2015151420 A | 8/2015 |
| JP | 2015182272 A | 10/2015 |
| JP | 2015182273 A | 10/2015 |
| JP | 2015203770 A | 11/2015 |
| JP | 2016006160 A | 1/2016 |
| JP | 2016011365 A | 1/2016 |
| JP | 5870222 B1 | 2/2016 |
| JP | 5878255 A | 3/2016 |
| JP | 2016050285 A | 4/2016 |
| JP | 2016060839 A | 4/2016 |
| JP | 2016172423 A | 9/2016 |
| JP | 2016172424 A | 9/2016 |
| JP | WO2015098495 A1 | 3/2017 |
| JP | 2017200042 A | 11/2017 |
| KR | 1020040094153 A | 11/2001 |
| KR | 20100129512 A | 12/2010 |
| KR | 10-2013-0058565 A | 12/2014 |
| TW | 200609110 A | 3/2006 |
| TW | 201300236 A | 1/2013 |
| TW | 201420652 A | 6/2014 |
| TW | 201437304 A | 10/2014 |
| TW | 201504320 A | 2/2015 |
| TW | 201602268 A | 1/2016 |
| WO | 2005113690 A2 | 12/2005 |
| WO | 2006102383 A1 | 9/2006 |
| WO | 2008029766 A1 | 3/2008 |
| WO | 2008067262 A1 | 6/2008 |
| WO | 2009113537 A1 | 9/2009 |
| WO | 2010079653 A1 | 7/2010 |
| WO | 2011033976 A1 | 3/2011 |
| WO | 2011145630 A1 | 11/2011 |
| WO | 2012026446 A | 3/2012 |
| WO | 2012144508 A1 | 10/2012 |
| WO | 2012144510 A1 | 10/2012 |
| WO | 2013129531 A1 | 9/2013 |
| WO | 2014030848 A1 | 2/2014 |
| WO | 2014203792 A1 | 12/2014 |
| WO | 2015001948 A1 | 1/2015 |
| WO | 2015005049 A1 | 1/2015 |
| WO | 2015033754 A1 | 3/2015 |
| WO | 2015045823 A1 | 4/2015 |
| WO | 2015098495 A1 | 7/2015 |
| WO | 2015146565 A | 10/2015 |
| WO | 2015171340 A1 | 11/2015 |
| WO | 2015182253 A1 | 12/2015 |
| WO | 2016147424 A1 | 9/2016 |
| WO | 2016147733 A1 | 9/2016 |
| WO | 2016147734 A1 | 9/2016 |
| WO | 2016147776 A1 | 9/2016 |
| WO | WO 2016/147739 * | 9/2016 |
| WO | 2017200042 A | 11/2017 |

OTHER PUBLICATIONS

EP15885519.7 Extended European Search Report dated Oct. 18, 2018; 8Pgs.
PCT/JP2016/084981 International Search Report dated Jan. 25, 2017; 2 pgs.
Artham, et al., Biodegradation of Aliphatic and Aromatic Polycarbonates, Macromol. Biosci, 2008, 8, 14-24. (Year: 2008).
KR10-2019-7001505 Office Action dated Feb. 20, 2019; 12 pgs.
JP2016-17863 Office Action dated Oct. 8, 2019; 11 pgs.
CN201680015908.7 Office Action dated Feb. 2, 2019; 12 pgs.
CN201810254960.9 Office Action dated Oct. 11, 2019, 13 pgs.
CN201680068951.X Office Action dated Sep. 29, 2019; 21 pgs.
Chinese Patent Application No. 201680015984.8 dated Jun. 4, 2019; 8 pgs.
JP2017-094366 Office Action dated Nov. 18, 2019, 11 pgs.
EP16872835.0 Extended European Search Report dated Jul. 8, 2019; 6 pgs.
EP16764565.4 Extended European Search Report dated Oct. 18, 2018; 8 pgs.
TW105104050 Office Action dated Aug. 20, 2019; 12 pgs.
CN201680015850.6 Office Action dated Jan. 24, 2019; 10 pgs.
JP2017069555 Office Action dated Nov. 27, 2018; 8 pgs.
PCT/JP2017/027297 International Search Report dated Aug. 29, 2017; 2 pgs.

(56) References Cited

OTHER PUBLICATIONS

JP2017-152119 Office Action dated Aug. 7, 2018; 10 pgs.
EP16764607.4 Search Report dated May 28, 2018; 8 pgs.
CN201680015900.0 Office Action dated Nov. 5, 2018; 12 pgs.
Chinese Patent Application No. 201680015900.0 dated Jun. 4, 2019; 8 pgs.
TW105104029 Office Action dated Mar. 7, 2019; 12 pgs.
CN201580003516.4 Office Action dated Jan. 17, 2018; 20 pgs.
Lai, et al., Synthetic Process and Application of Silicone Products, 2nd Edition, Nov. 2009, 4 pgs.
JP6144330 Opposition Paper dated Dec. 5, 2017; 45 PGS.
Yamamoto, et al.; Application of Chemically Absorbed Fluorocarbon Film with Highly Durability as a Mold Release Agent; Seikei-Kakou vol. 22 No. 2, 2010; pp. 104-114.
KR10-2016-7017502 Office Action dated Oct. 27, 2017; 18pgs.
PCT/JP2016/052927 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
PCT/JP2016/052950 International Search Report dated Apr. 19, 2016; 2 pgs.
PCT/JP2016/084794 International Search Report dated Jan. 25, 2017; 2 pgs.
KR10-2016-7017502 Decision of Rejection dated May 10, 2018; 8 pgs.
EP16764570.4 Search Report dated May 28, 2018; 8 pgs.
PCT/JP2016/084981 International Preliminary Report on Patentability dated Jun. 21, 2018; 13 pgs.
EP16764564.7 Extended European Search Report dated Oct. 18, 2018; 8 pgs.
KR10-2017-7026048 Korean Office Action dated Nov. 1, 2018; 14 pgs.
CN201680015902.X Second Office Action dated Jul. 17, 2019; 16 pgs.
EP16764550.6 Extended European Search Report dated Oct. 18, 2018; 8 pgs.
EP16868622.8 Extended European Search Report dated May 20, 2019; 8 pgs.
CN201680015984.8 Office Action dated Sep. 10, 2019, 13 pgs.
CN201680015902.X Office Action Jan. 2, 2020, 16 pgs.
JP2016-29588 Office Action dated Dec. 24, 2019, 7 pgs.
EP15885519.7 Third Party Observations dated Jan. 8, 2020, 85 pgs.
EP17850559.0 Supplementary Search Report dated Mar. 18, 2020, 10 pgs.
CN201811070889.5 Office Action dated Jan. 10, 2020, 15 pgs.
CN201780055888.0 First Office Action dated Jul. 2, 2020, 11 pgs.
EP20150371.1 Extended European Search Report dated Apr. 7, 2020, 8 pgs.
EP17874537.8 Supplementary Search Report dated May 14, 2020, 12 pgs.
EP20150365.3 Extended European Search Report dated Apr. 9, 2020, 8 pgs.
EP20150373.7 Extended European Search Report dated Apr. 7, 2020, 9 pgs.
JP2017-094366 Office Action dated May 19, 2020, 15 pgs.
JP2016-24288 Opposition Against JP6599789 dated Jun. 24, 2020, 64 pgs.
Website of Fluorolink@PFPE (including a fluorine-containing water repellent agent "Fluorolink AD 1700"), https://www.solvay.jp/ja/markets-and-products/featured-products/Fluorolink.html, Jan. 7, 2020, 2pgs.
CN201810254960.9 Second Office Action dated Jun. 9, 2020, 11 pgs.

* cited by examiner

HARD COAT LAYERED FILM

CROSS REFERENCE TO RELATED APPLICATIONS

This application claims the benefit of and priority to PCT/JP2016/084981, filed on Nov. 25, 2016, entitled (translation), "HARD COAT LAYERED FILM," which claims the benefit of and priority to Japanese Patent Application No. 2015-239074, filed on Dec. 8, 2015, which is hereby incorporated by reference in its entirety into this application.

BACKGROUND

Field

Embodiments relate to a hard coat laminated film. More specifically, embodiments relate to a hard coat laminated film excellent in transparency, color tone, abrasion resistance, surface hardness, and surface appearance.

Background Art

In recent years, touch panels, which are installed on an image display device such as a liquid crystal display, a plasma display and an electroluminescence display and enable input by touching with fingers, a pen or the like while watching displayed objects, have become popular.

For a display faceplate in a touch panel, articles using glass as the base material have been conventionally used because they meet the required properties such as heat resistance, dimensional stability, high transparency, high surface hardness and high stiffness. On the other hand, glass has disadvantages such as a low impact resistance and consequent fragility; a low processability; difficulty in handling; a high specific weight and a consequent heavy weight; and difficulty in satisfying the demand for a curved or flexible display. Thus, materials as a substitute for glass are actively being studied, and many hard coat laminated films have been proposed in which a hard coat excellent in surface hardness and abrasion resistance is formed on the surface of a transparent resin film formed of triacetylcellulose, polyethylene terephthalate, polycarbonate, polymethyl methacrylate, a norbornene polymer or the like (e.g., see JP 2000-052472 A and JP 2000-214791 A). However, the abrasion resistance is still insufficient in each of them. A hard coat laminated film has been required which can maintain surface properties such as finger slidability even after repeated wipes with a handkerchief or the like.

SUMMARY

An object of the various embodiments is to provide a hard coat laminated film which is excellent in transparency, color tone, abrasion resistance, surface hardness, and surface appearance and which is suitable as a member in an image display device such as a liquid crystal display, a plasma display and an electroluminescence display (including an image display device with a touch panel function and an image display device with no touch panel function), particularly for a display faceplate in an image display device with a touch panel function.

As a result of intensive studies, the inventors have found that the above object can be achieved by laminating two kinds of specific hard coats according to various embodiments.

According to at least one embodiment, there is provided a hard coat laminated film including a first hard coat, a second hard coat, and a transparent resin film layer in order from a surface layer side, whereby the first hard coat includes (A) 100 parts by mass of a polyfunctional (meth)acrylate including 20% by mass or more of a tripentaerythritol acrylate; (B) 0.01 to 7 parts by mass of a water repellent; and (C) 0.01 to 10 parts by mass of a silane coupling agent, wherein the first hard coat is formed from a coating material not containing inorganic particles; and wherein the second hard coat includes (A') 100 parts by mass of a polyfunctional (meth)acrylate; and (D) 50 to 300 parts by mass of inorganic fine particles having an average particle diameter of 1 to 300 nm.

According to at least one embodiment, the polyfunctional (meth)acrylate includes 20% by mass or more of a tripentaerythritol acrylate of component (A) is a mixture of a tripentaerythritol acrylate; and one or more species selected from the group consisting of a dipentaerythritol acrylate, a monopentaerythritol acrylate, and a polypentaerythritol acrylate.

According to at least one embodiment, the (C) silane coupling agent includes one or more species selected from the group consisting of a silane coupling agent having an amino group and a silane coupling agent having a mercapto group.

According to at least one embodiment, the (B) water repellent includes a (meth)acryloyl group-containing fluoropolyether water repellent.

According to at least one embodiment, the coating material for forming the second hard coat further includes (E) 0.01 to 1 part by mass of a leveling agent.

According to at least one embodiment, a thickness of the first hard coat is 0.5 to 5 μm.

According to at least one embodiment, a thickness of the second hard coat is 10 to 30 μm.

According to at least one embodiment, the transparent resin film is a transparent multilayer film with a first poly (meth)acrylimide resin layer ($\alpha1$); an aromatic polycarbonate resin layer ($\beta$); and a second poly(meth)acrylimide resin layer ($\alpha2$) directly laminated in this order.

According to at least one embodiment, there is provided for the use of the hard coat laminated film discussed above for a member in an image display device.

According to at least one embodiment, there is provided an image display device including the hard coat laminated film discussed above.

Embodiments provide a hard coat laminated film which is excellent in transparency, color tone, abrasion resistance, surface hardness, and surface appearance. Therefore, the hard coat laminated film, according to various embodiments, can be suitably used for a member in an image display device such as a liquid crystal display, a plasma display and an electroluminescence display (including an image display device with a touch panel function and an image display device with no touch panel function), particularly for a display faceplate in an image display device with a touch panel function.

DETAILED DESCRIPTION

Figure 1:
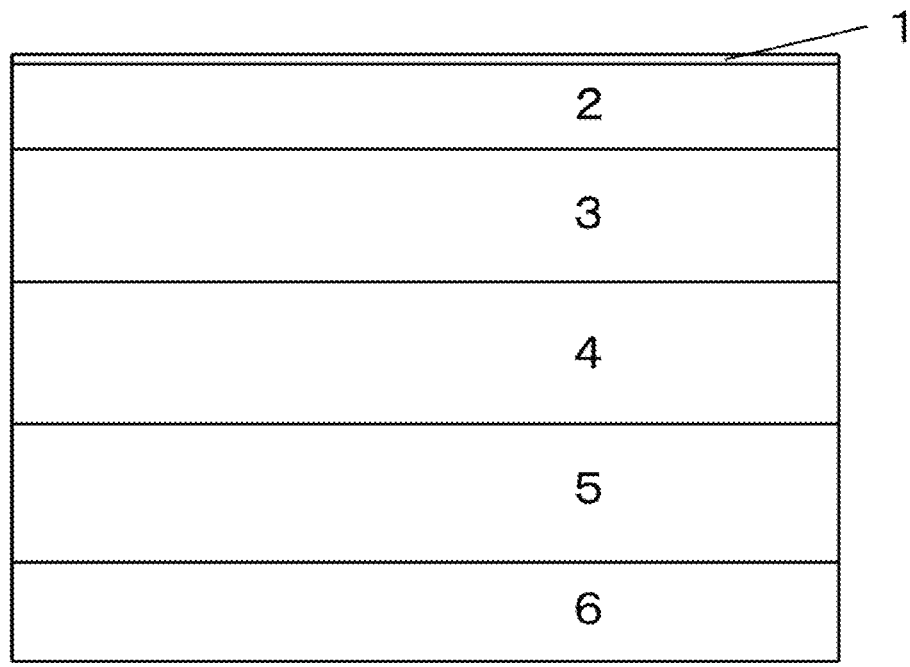
FIG. 1 is a cross-sectional view illustrating an example of a hard coat laminated film according to an embodiment.

The hard coat laminated film according to various embodiments includes a first hard coat, a second hard coat, and a transparent resin film layer in order from the surface layer side.

First Hard Coat

The first hard coat usually constitutes the surface of the hard coat laminated film according to an embodiment. In the case where the hard coat laminated film according to various embodiments is used for a display faceplate in an image display device with a touch panel function, the first hard coat functions as a touch surface. The first hard coat exhibits good abrasion resistance, and serves to maintain surface properties such as finger slidability even after repeated wipes with a handkerchief or the like.

According to at least one embodiment, the first hard coat is formed from a coating material including (A) 100 parts by mass of a polyfunctional (meth)acrylate including 20% by mass or more of a tripentaerythritol acrylate; (B) 0.01 to 7 parts by mass of a water repellent; and (C) 0.01 to 10 parts by mass of a silane coupling agent and containing no inorganic particles.

According to at least one embodiment, the inorganic particles (e.g., silica (silicon dioxide); metal oxide particles such as aluminum oxide, zirconia, titania, zinc oxide, germanium oxide, indium oxide, tin oxide, indium tin oxide, antimony oxide, and cerium oxide; metal fluoride particles such as magnesium fluoride, and sodium fluoride; metal sulfide particles; metal nitride particles; and metal particles) are highly effective in enhancing the hardness of a hard coat. On the other hand, the weak interaction between inorganic particles and a resin component such as component (A) may often result in insufficient abrasion resistance. Accordingly, various embodiments allow the first hard coat on the surface layer side of the hard coat laminated film (in the case where the hard coat laminated film is used for a display faceplate in an image display device with a touch panel function, the first hard coat functions as a touch surface) to contain no inorganic particles for retaining the abrasion resistance and on the other hand allows the second hard coat to contain inorganic fine particles having an average particle diameter of 1 to 300 nm for enhancing the hardness, and thereby has solved this problem.

Here, "containing no" inorganic particles means not containing a significant amount of inorganic particles. In the field of coating materials for forming a hard coat, the significant amount of inorganic particles is typically about 1 part by mass or more based on 100 parts by mass of component (A). Therefore, "containing no" inorganic particles can be represented otherwise as follows: the amount of inorganic particles is typically 0 part by mass or more and less than 1 part by mass, preferably 0.1 part by mass or less and more preferably 0.01 part by mass or less based on 100 parts by mass of component (A).

(A) Polyfunctional (meth)acrylate Including 20% by Mass or More of Tripentaerythritol Acrylate According to at least one embodiment, the polyfunctional (meth)acrylate includes 20% by mass or more of a tripentaerythritol acrylate of component (A) is a (meth)acrylate having two or more (meth)acryloyl groups in one molecule, which includes a tripentaerythritol acrylate in an amount of 20% by mass or more, preferably 40% by mass or more, more preferably 50% by mass or more. Component (A) may include a tripentaerythritol acrylate in an amount of 100% by mass or less, or less than 100% by mass, or 90% by mass or less, or 80% by mass or less. Here, the mass ratio of tripentaerythritol acrylate is based on 100% by mass of the sum of substances contained in component (A). The term (meth)acrylate referred to herein means acrylate or methacrylate. Since component (A) has two or more (meth)acryloyl groups in one molecule, it serves to form a hard coat through polymerization/curing with an active energy ray such as a UV ray and an electron beam.

Component (A) is more preferably a mixture of a tripentaerythritol acrylate and one or more species selected from the group consisting of a dipentaerythritol acrylate, a monopentaerythritol acrylate, and a polypentaerythritol acrylate. Here, the content of tripentaerythritol acrylate in the above mixture is 20% by mass or more, preferably 40% by mass or more, more preferably 50 to 80% by mass, assuming that the sum of the respective components is 100% by mass. In another embodiment, the content of tripentaerythritol acrylate in the above mixture is 20 to 80% by mass or 40 to 80% by mass, assuming that the sum of the respective components is 100% by mass.

The term tripentaerythritol acrylate refer is a compound having a structure in which three pentaerythritol acrylates are linked, and has 8 or 7 (when a hydroxyl group remains at a terminal end) acryloyl groups. That is, the term tripentaerythritol acrylate refers to tripentaerythritol heptaacrylate, tripentaerythritol octaacrylate, or a mixture thereof (mass ratio 0:100 to 100:0). The general structure of polyfunctional pentaerythritol acrylate is shown in the following formula (1). Here, n is an integer of 0 or more, and R is —H or —COCH=CH$_2$. Although a molar ratio of —H:—COCH=CH$_2$ for R is not particularly limited, it is usually from 40:60 to 80:20 from a viewpoint of optimization of viscosity of a coating material to be obtained, more typically may be from 50:50 to 70:30. When n=2 in the following formula (1), it represents tripentaerythritol heptaacrylate or tripentaerythritol octaacrylate.

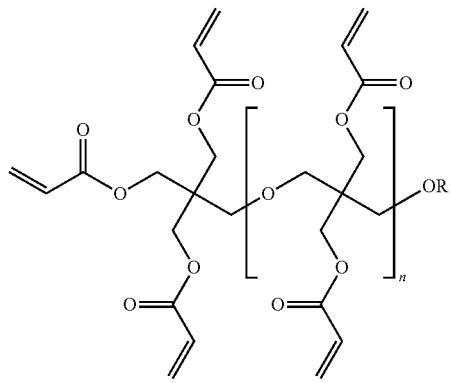

The term dipentaerythritol acrylate is a compound having a structure in which two pentaerythritol acrylates are linked, and has 6 or 5 (when a hydroxyl group remains at a terminal end) acryloyl groups (n=1).

The term monopentaerythritol acrylate has 4 or 3 (when a hydroxyl group remains at a terminal end) acryloyl groups (n=0).

The term polypentaerythritol acrylate is a compound having a structure in which four or more pentaerythritol acrylates are linked, and, assuming that the number of linkages is N (=n+1), has (2N+2) or (2N+1) (when a hydroxyl group remains at a terminal end) acryloyl groups. Although the upper limit of N is theoretically not particularly limited, it may be usually 6 or less from viewpoints of optimization of viscosity of a coating material containing this compound and the possibility of actual synthesis.

Component (A) may include other polyfunctional (meth) acrylates besides a tripentaerythritol acrylate, dipentaerythritol acrylate, monopentaerythritol acrylate, and polypentaerythritol acrylate. Although such other polyfunctional (meth)acrylates are not particularly limited, examples thereof include (meth)acryloyl group-containing bifunctional reactive monomers such as diethylene glycol di(meth) acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl) propane; (meth)acryloyl group-containing trifunctional reactive monomers such as trimethylolpropane tri(meth) acrylate, trimethylolethane tri(meth)acrylate and ethoxylated trimethylolpropane tri(meth)acrylate; (meth)acryloyl group-containing tetrafunctional reactive monomers such as ditrimethylol propane tetra (meth)acrylate and pentaerythritol tetra(meth)acrylate; (meth)acryloyl group-containing hexafunctional reactive monomers such as dipentaerythritol hexaacrylate; and polymers (or oligomers and prepolymers) including one or more of them as constituent monomers. For the other polyfunctional (meth)acrylates, one of them or a mixture of two or more thereof can be used.

(B) Water Repellent

According to at least one embodiment, the water repellent of component (B) serves to enhance the finger slidability, the resistance to deposition of stain or fouling and the wipeability against stain or fouling.

Examples of the water repellent include wax water repellents such as a paraffin wax, a polyethylene wax and an acryl-ethylene copolymer wax; silicone water repellents such as a silicone oil, a silicone resin, a polydimethylsiloxane and an alkylalkoxysilane; and fluorine-containing water repellents such as a fluoropolyether water repellent and a fluoropolyalkyl water repellent. One of them or a mixture of two or more thereof can be used for the water repellent of component (B).

Among them, a fluoropolyether water repellent is preferred for the water repellent as component (B) from a viewpoint of water repellent performance. A water repellent including a compound having a (meth)acryloyl group and a fluoropolyether group in the molecule (hereinafter, abbreviated as a (meth)acryloyl group-containing fluoropolyether water repellent) is more preferred for the water repellent as component (B) from a viewpoint that component (A) and component (B) can chemically bond or strongly interact together to prevent troubles such as the bleed-out of component (B). Still more preferred for the water repellent as component (B) is an admixture of an acryloyl group-containing fluoropolyether water repellent and a methacryloyl group-containing fluoropolyether water repellent from a viewpoint of appropriately controlling the chemical bond or the interaction between component (A) and component (B) to allow to exhibit good water repellency while keeping the transparency high.

According to at least one embodiment, the amount of the water repellent as component (B) to be blended is typically 7 parts by mass or less, preferably 4 parts by mass or less, and more preferably 2 parts by mass or less based on 100 parts by mass of component (A) from a viewpoint of preventing troubles such as the bleed-out of component (B). At the same time, the amount of the water repellent as component (B) to be blended is typically 0.01 part by mass or more, preferably 0.05 parts by mass or more, and more preferably 0.1 part by mass or more from a viewpoint of obtaining the effect of use thereof. The amount of the water repellent to be blended may be typically 0.01 part by mass or more and 7 parts by mass or less, and preferably be 0.01 part by mass or more and 4 parts by mass or less, or 0.01 part by mass or more and 2 parts by mass or less, or preferably 0.05 parts by mass or more and 7 parts by mass or less, or 0.05 parts by mass or more and 4 parts by mass or less, or 0.05 parts by mass or more and 2 parts by mass or less, or preferably 0.1 part by mass or more and 7 parts by mass or less, or 0.1 part by mass or more and 4 parts by mass or less, or 0.1 part by mass or more and 2 parts by mass or less.

(C) Silane Coupling Agent

The silane coupling agent as component (C) serves to enhance the adhesiveness between the first hard coat and the second hard coat.

According to at least one embodiment, the silane coupling agent to be used is a silane compound having at least two types of different reactive groups: a hydrolyzable group (e.g., an alkoxy group such as a methoxy group and an ethoxy group; an acyloxy group such as acetoxy group; and a halogen group such as a chloro group) and an organic functional group (e.g., an amino group, a mercapto group, a vinyl group, an epoxy group, a methacryloxy group, an acryloxy group and an isocyanate group). Among them, silane coupling agents having an amino group (i.e., silane coupling compounds having an amino group and a hydrolyzable group) and silane coupling agents having a mercapto group (i.e., silane coupling compounds having a mercapto group and a hydrolyzable group) are preferred for the silane coupling agent as component (C) from a viewpoint of adhesiveness. Silane coupling agents having an amino group are more preferred from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

One of them or a mixture of two or more thereof can be used for the silane coupling agent as component (C).

According to at least one embodiment, the amount of the silane coupling agent as component (C) to be blended is typically 0.01 part by mass or more, preferably 0.05 parts by mass or more, and more preferably 0.1 part by mass or more based on 100 parts by mass of component (A) from a viewpoint of obtaining the adhesiveness-enhancing effect reliably. At the same time, the amount of the silane coupling agent as component (C) to be blended may be typically 10 parts by mass or less, preferably 5 parts by mass or less, and more preferably 1 part by mass or less, from a viewpoint of the pot life of a coating material. The amount of the silane coupling agent to be blended may be typically 0.01 part by mass or more and 10 parts by mass or less, and preferably 0.01 part by mass or more and 5 parts by mass or less, or 0.01 part by mass or more and 1 part by mass or less, or preferably 0.05 parts by mass or more and 10 parts by mass or less, or 0.05 parts by mass or more and 5 parts by mass or less, or 0.05 parts by mass or more and 1 part by mass or less, or preferably 0.1 part by mass or more and 10 parts by mass or less, or 0.1 part by mass or more and 5 parts by mass or less, or 0.1 part by mass or more and 1 part by mass or less.

It is preferable that the coating material for forming the first hard coat further includes a compound having two or more isocyanate groups (—N=C=O) in one molecule and/or a photopolymerization initiator from a viewpoint of improved curability with an active energy ray.

Examples of the compound having two or more isocyanate groups in one molecule include methylenebis-4-cyclohexylisocyanate; polyisocyanates such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate and a biuret form of hexamethylene diisocyanate; and urethane crosslinking agents such as blocked isocyanates of the polyisocyanates. One of them or a mixture of two or more thereof can be used for the compound having two or more isocyanate groups in one molecule. In crosslinking, a catalyst such as dibutyltin dilaurate and dibutyltin diethylhexoate may be added as necessary.

Examples of the photopolymerization initiator include benzophenone compounds such as benzophenone, methylo-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate compounds; hydroxyketone compounds; and aminobenzoate compounds. One of them or a mixture of two or more thereof can be used for the photopolymerization initiator.

According to at least one embodiment, the coating material for forming the first hard coat may include one or two or more of additives such as an antistatic agent, a surfactant, a leveling agent, a thixotropy-imparting agent, an antifouling agent, a printability improver, an antioxidant, a weatherability stabilizer, a light resistance stabilizer, a UV absorber, a heat stabilizer, organic fine particles and an organic colorant, as desired.

According to at least one embodiment, the coating material for forming the first hard coat may include a solvent as desired for dilution to a concentration which allows easy application. The solvent is not particularly limited as long as the solvent neither reacts with any of components (A) to (C) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. One of them or a mixture of two or more thereof can be used for the solvent.

The coating material for forming the first hard coat can be obtained by mixing and stirring these components.

The method for forming the first hard coat using the coating material for forming the first hard coat is not particularly limited, and any known web coating method can be used. Examples of the above method include roll coating, gravure coating, reverse coating, roll brushing, dip coating, spray coating, spin coating, air knife coating and die coating.

The thickness of the first hard coat is preferably 0.5 µm or more, and more preferably 1 µm or more from a viewpoint of abrasion resistance and hardness. At the same time, the thickness of the first hard coat is preferably 5 µm or less, more preferably 4 µm or less, and still more preferably 3 µm or less from a viewpoint of hardness and the adhesiveness to the second hard coat.

In addition, the thickness of the first hard coat may be preferably 0.5 µm or more and 5 µm or less, or 0.5 µm or more and 4 µm or less, or 0.5 µm or more and 3 µm or less, or preferably 1 µm or more and 5 µm or less, or 1 µm or more and 4 µm or less, or 1 µm or more and 3 µm or less.

Second Hard Coat

According to at least one embodiment, the second hard coat is formed from a coating material including (A') 100 parts by mass of a polyfunctional (meth)acrylate; and (D) 50 to 300 parts by mass of inorganic fine particles having an average particle diameter of 1 to 300 nm.

(A') Polyfunctional (meth)acrylate

The polyfunctional (meth)acrylate as component (A') is a (meth)acrylate having two or more (meth)acryloyl groups in one molecule. Since this component has two or more (meth)acryloyl groups in one molecule, it serves to form a hard coat through polymerization/curing with an active energy ray such as a UV ray and an electron beam.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate, trimethylolethane tri(meth)acrylate, pentaerythritol tri(meth)acrylate, and ethoxylated trimethylolpropane tri(meth)acrylate; (meth)acryloyl group-containing tetrafunctional reactive monomers such as ditrimethylol propane tetra(meth)acrylate and pentaerythritol tetra(meth)acrylate; (meth)acryloyl group-containing hexafunctional reactive monomers such as dipentaerythritol hexaacrylate; and polymers (or oligomers and prepolymers) including one or more of them as constituent monomers. One of them or a mixture of two or more thereof can be used for component (A'). Further, the compounds exemplified for component (A) may be used as component (A').

The term (meth)acrylate referred to herein means acrylate or methacrylate.

(D) Inorganic Fine Particles Having an Average Particle Diameter of 1 to 300 nm

The inorganic fine particles as component (D) serve to dramatically enhance the hardness of the hard coat laminated film according to various embodiments.

Examples of the inorganic fine particles include silica (silicon dioxide); metal oxide fine particles such as aluminum oxide, zirconia, titania, zinc oxide, germanium oxide, indium oxide, tin oxide, indium tin oxide, antimony oxide, and cerium oxide; metal fluoride fine particle such as magnesium fluoride, and sodium fluoride; metal sulfide fine particles; metal nitride fine particles; and metal fine particles.

Among them, fine particles such as silica and aluminum oxide are preferred and silica fine particles are more preferred in order to obtain a hard coat having a higher surface hardness. Examples of commercial available silica fine particles include Snowtex (trade name) available from Nissan Chemical Industries, Ltd. and Quartron (trade name) available from Fuso Chemical Co., Ltd.

In order to enhance the dispersibility of inorganic fine particles in the coating material or enhance the surface hardness of a hard coat to be obtained, it is preferred to use inorganic fine particles the surface of which have been treated with any one selected from a silane coupling agent such as a vinylsilane and an aminosilane; a titanate coupling agent; an aluminate coupling agent; an organic compound having a reactive functional group such as an ethylenic unsaturated bond group such as a (meth)acryloyl group, a vinyl group and an allyl group and an epoxy group; a surface-treatment agent such as a fatty acid and a fatty acid metal salt; and the like.

The average particle diameter of the inorganic fine particles as component (D) is 300 nm or less, preferably 200 nm or less, and more preferably 120 nm or less from a viewpoint of retaining the transparency of a hard coat and obtaining the hardness-improving effect reliably. Although the lower limit of the average particle diameter of the inorganic fine particles as component (D) is not particularly limited, the average particle diameter of inorganic fine particles commonly available is about 1 nm at the finest.

The average particle diameter of inorganic fine particles herein refers to a particle diameter at which a cumulative value from the smallest particle diameter reaches to 50% by mass in a particle diameter distribution curve determined by using a laser diffraction/scattering particle diameter analyzer "MT 3200 II" (trade name) available from Nikkiso Co., Ltd.

The amount of the inorganic fine particles as component (D) to be blended is 50 parts by mass or more, and preferably 80 parts by mass or more based on 100 parts by mass of component (A') from a viewpoint of surface hardness. At the same time, the amount of the inorganic fine particles as component (D) to be blended is 300 parts by mass or less, preferably 200 parts by mass or less, and more preferably 160 parts by mass or less from a viewpoint of transparency. The amount of the inorganic fine particles to be blended may be typically 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, or 80 parts by mass or more and 200 parts by mass or less, or 80 parts by mass or more and 160 parts by mass or less.

(E) Leveling Agent

According to at least one embodiment, the coating material for forming the second hard coat preferably further includes (E) a leveling agent from a viewpoint of smoothing the surface of the second hard coat to facilitate forming the first hard coat.

Examples of the leveling agent include acrylic leveling agents, silicone leveling agents, fluorine-containing leveling agents, silicone-acrylic copolymer leveling agents, fluorine-modified acrylic leveling agents, fluorine-modified silicone leveling agents, and leveling agents into which a functional group (e.g., an alkoxy group such as a methoxy group and an ethoxy group, an acyloxy group, a halogen group, an amino group, a vinyl group, an epoxy group, a methacryloxy group, an acryloxy group and an isocyanate group) is introduced. Among them, silicone-acrylic copolymer leveling agents are preferred for the leveling agent as component (E). One of them or a mixture of two or more thereof can be used for the leveling agent as component (E).

The amount of the leveling agent as component (E) to be blended is typically 0.01 part by mass or more, preferably 0.1 part by mass or more, and more preferably 0.2 parts by mass or more based on 100 parts by mass of component (A') from a viewpoint of smoothing the surface of the second hard coat to facilitate forming the first hard coat. At the same time, the amount of the leveling agent to be blended may be 1 part by mass or less, preferably 0.6 parts by mass or less, and more preferably 0.4 parts by mass or less from a viewpoint of satisfactorily applying the coating material for forming the first hard coat on the second hard coat without being repelled. The amount of the leveling agent to be blended may be typically 0.01 part by mass or more and 1 part by mass or less, preferably 0.01 part by mass or more and 0.6 parts by mass or less, or 0.01 part by mass or more and 0.4 parts by mass or less, or preferably 0.1 part by mass or more and 1 part by mass or less, or 0.1 part by mass or more and 0.6 parts by mass or less, or 0.1 part by mass or more and 0.4 parts by mass or less, or preferably 0.2 parts by mass or more and 1 part by mass or less, or 0.2 parts by mass or more and 0.6 parts by mass or less, or 0.2 parts by mass or more and 0.4 parts by mass or less.

It is preferable that the coating material for forming the second hard coat further includes a compound having two or more isocyanate groups (—N=C=O) in one molecule and/or a photopolymerization initiator from a viewpoint of improved curability with an active energy ray.

The compound having two or more isocyanate groups in one molecule has been illustrated above in the description of the coating material for forming the first hard coat. One of them or a mixture of two or more thereof can be used for the compound having two or more isocyanate groups in one molecule.

The photopolymerization initiator has been illustrated above in the description of the coating material for forming the first hard coat. One of them or a mixture of two or more thereof can be used for the photopolymerization initiator.

The coating material for forming the second hard coat may include one or two or more of additives such as an antistatic agent, a surfactant, a thixotropy-imparting agent, an antifouling agent, a printability improver, an antioxidant, a weatherability stabilizer, a light resistance stabilizer, a UV absorber, a heat stabilizer, a colorant and organic fine particles, as desired.

The coating material for forming the second hard coat may include a solvent as desired for dilution to a concentration which allows easy application. The solvent is not particularly limited as long as the solvent neither reacts with any of components (A') and (D) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, acetone, and the like. Among them, 1-methoxy-2-propanol is preferred. One of them or a mixture of two or more thereof can be used for the solvent.

The coating material for forming the second hard coat can be obtained by mixing and stirring these components.

The method for forming the second hard coat using the coating material for forming the second hard coat is not particularly limited, and known web coating methods can be used. Examples of the above method include roll coating, gravure coating, reverse coating, roll brushing, dip coating, spray coating, spin coating, air knife coating and die coating.

The thickness of the second hard coat is preferably 10 μm or more, more preferably 15 μm or more and still more preferably 18 μm or more from a viewpoint of hardness. At the same time, the thickness of the second hard coat is preferably 30 μm or less, more preferably 27 μm or less, and still more preferably 25 μm or less from a viewpoint of curling resistance and bending resistance.

In addition, the thickness of the second hard coat may be preferably 10 μm or more and 30 μm or less, or 10 μm or more and 27 μm or less, or 10 μm or more and 25 μm or less, or preferably 15 μm or more and 30 μm or less, or 15 μm or more and 27 μm or less, or 15 μm or more and 25 μm or less, or preferably 18 μm or more and 30 μm or less, or 18 μm or more and 27 μm or less, or 18 μm or more and 25 μm or less.

Transparent Resin Film

According to at least one embodiment, the transparent resin film is a layer functioning as a transparent film base material for forming the first hard coat and the second hard coat thereabove. Any transparent resin film can be used for the transparent resin film without limitation as long as it has a high transparency and no coloring. Examples thereof include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate and polyethyl methacrylate; a poly(meth)acrylimide resin; an aromatic polycarbonate resin; a polyolefin resin such as polypropylene and 4-methyl-penten-1; a polyamide resin; a polyarylate resin; a polymer-type urethane acrylate resin; and a polyimide resin. These films encompass cast films, uniaxially oriented films and biaxially oriented films. Further, these films encompass laminated films with one type of the above-illustrated films or two or more types thereof laminated in two or more layers.

According to at least one embodiment, the thickness of the transparent resin film, which is not particularly limited, can be any thickness as desired. The thickness of the transparent resin film may be typically 20 μm or more and preferably 50 μm or more from a viewpoint of the handleability of the hard coat laminated film according to various embodiments. In the case where the hard coat laminated film according to various embodiments is used for a display faceplate in a touch panel, the thickness of the transparent resin film may be typically 100 μm or more, preferably 200 μm or more, and more preferably 300 μm or more from a viewpoint of retaining the stiffness. Further, the thickness of the transparent resin film may be typically 1500 μm or less, preferably 1200 μm or less and more preferably 1000 μm or less from a viewpoint of meeting the requirement for a thinner touch panel. In applications in which a high stiffness is not required other than a display faceplate in a touch panel, the thickness of the transparent resin film may be typically 250 μm or less and preferably 150 μm or less from a viewpoint of economic efficiency.

According to at least one embodiment, the transparent resin film is preferably a poly(meth)acrylimide resin film. This allows the hard coat laminated film to be excellent in surface hardness, abrasion resistance, transparency, surface smoothness, appearance, stiffness, heat resistance and dimensional stability, and as a result the hard coat laminated film can be suitably used for a display faceplate in a touch panel or a transparent electroconductive substrate.

The poly(meth)acrylimide resin is a thermoplastic resin obtained by introducing characteristics of excellent heat resistance and excellent dimensional stability derived from a polyimide resin and overcoming a drawback of being colored from pale yellow to reddish brown while high transparency, high surface hardness, and high rigidity derived from an acrylic resin are retained. Such a poly(meth)acrylimide resin is disclosed in JP2011-519999A, for example. It should be noted that the term poly(meth)acrylimide herein means a polyacrylimide or a polymethacrylimide.

The poly(meth)acrylimide resin is not limited as long as having high transparency and being not colored for the purpose of using the hard coat laminated film for optical articles such as a touch panel, and any poly(meth)acrylimide resin can be used.

Preferred examples of the poly(meth)acrylimide resin include ones having a yellowness index of 3 or less (measured with a colorimeter "SolidSpec-3700" (trade name) available from Shimadzu Corporation in accordance with JIS K7105:1981). The yellowness index is more preferably 2 or less and still more preferably 1 or less. Further, preferred examples of the poly(meth)acrylimide resin include poly(meth)acrylimide resins having a melt mass-flow rate of 0.1 to 20 g/10 min (measured under conditions of 260° C. and 98.07 N in accordance with ISO 1133) from a viewpoint of extrusion load and the stability of a melted film. The melt mass-flow rate is more preferably 0.5 to 10 g/10 min. Further, the glass transition temperature of the poly(meth)acrylimide resin is preferably 150° C. or higher from a viewpoint of heat resistance. The glass transition temperature is more preferably 170° C. or higher.

The poly(meth)acrylimide resin may further include, within a range that is not contrary to the object of the various embodiments described herein, a thermoplastic resin other than the poly(meth)acrylimide resin; a pigment, an inorganic filler, an organic filler, a resin filler; an additive such as, a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the poly(meth)acrylimide resin.

Examples of commercial available products of the poly(meth)acrylimide resin can include "PLEXIMID TT50" (trade name) and "PLEXIMID TT70" (trade name) available from Evonik Industry AG.

The poly(meth)acrylimide resin film is preferably a transparent multilayer film with a first poly(meth)acrylimide resin layer ($\alpha1$); an aromatic polycarbonate resin layer ($\beta$); and a second poly(meth)acrylimide resin layer ($\alpha2$) directly laminated in this order. This embodiment is herein described under the assumption that the $\alpha1$ layer side acts as a touch surface.

The poly(meth)acrylimide resin is excellent in heat resistance and surface hardness but often insufficient in cutting processability. On the other hand, the aromatic polycarbonate resin is excellent in cutting processability but often insufficient in heat resistance and surface hardness. Therefore, using a transparent multilayer film having the above-illustrated layer configuration enables to easily obtain a hard coat laminated film in which both substances cover for each other's drawbacks and which is excellent in all of heat resistance, surface hardness and cutting processability.

The layer thickness of the $\alpha1$ layer, although not particularly limited, may be typically 20 μm or more, preferably 40 μm or more, more preferably 60 μm or more and still more preferably 80 μm or more from a viewpoint of the heat resistance and the surface hardness of the hard coat laminated film according to various embodiments.

The layer thickness of the α2 layer, although not particularly limited, is preferably the same layer thickness as the α1 layer from a viewpoint of the curling resistance of the hard coat laminated film according to various embodiments.

"The same layer thickness" referred to herein should not be interpreted to be the same layer thickness in a physicochemically strict sense of the word. It should be interpreted to be the same layer thickness within a variation in a process/quality control usually performed industrially. The reason is that curling resistance of a multilayer film can be kept good when the layer thicknesses are the same within a variation in a process/quality control usually performed industrially. A cast multilayer film obtained by a T-die coextrusion method is typically subjected to a process/quality control within a variation of about −5 to +5 μm, and therefore the layer thickness of 65 μm and the layer thickness of 75 μm should be interpreted to be identical. "The same layer thickness" here can be paraphrased as "substantially the same layer thickness".

The layer thickness of the β layer, although not particularly limited, may be typically 20 μm or more and preferably 80 μm or more from a viewpoint of the cutting processability of the hard coat laminated film according to various embodiments.

The poly(meth)acrylimide resin to be used for the α1 layer and the α2 layer has been illustrated above.

For the poly(meth)acrylimide resin to be used for the α1 layer and the poly(meth)acrylimide resin to be used for the α2 layer, poly(meth)acrylimide resins different in resin properties, for example, poly(meth)acrylimide resins different in melt mass-flow rate or glass transition temperature may be used. It is preferred to use poly(meth)acrylimide resins having the same resin properties from a viewpoint of the curling resistance of the hard coat laminated film according to various embodiments. Using poly(meth)acrylimide resins in the same grade and in the same lot is one of preferred embodiments, for example.

Examples of the aromatic polycarbonate resin to be used for the β layer include aromatic polycarbonate resins such as polymers obtained by interfacial polymerization of an aromatic dihydroxy compound such as bisphenol A, dimethyl bisphenol A and 1,1-bis(4-hydroxyphenyl)-3,3,5-trimethylcyclohexane with phosgene; and polymers obtained by transesterification reaction of an aromatic dihydroxy compound such as bisphenol A, dimethyl bisphenol A and 1,1-bis(4-hydroxyphenyl)-3,3,5-trimethylcyclohexane with a carbonate diester such as diphenyl carbonate. One of them or a mixture of two or more thereof can be used for the aromatic polycarbonate resin to be used for the β layer.

Preferred examples of optional components which can be contained in the aromatic polycarbonate resin include core-shell rubbers. Using 0 to 30 parts by mass of a core-shell rubber (100 to 70 parts by mass of the aromatic polycarbonate resin), preferably 0 to 10 parts by mass of a core-shell rubber (100 to 90 parts by mass of the aromatic polycarbonate resin) based on 100 parts by mass of the total amount of the aromatic polycarbonate resin and the core-shell rubber can further enhance the cutting processability and the impact resistance of a hard coat laminated film.

Examples of the core-shell rubber include core-shell rubbers such as a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The aromatic polycarbonate resin can further include, within a range that is not contrary to the object of the various embodiments, a thermoplastic resin other than the aromatic polycarbonate resin or the core-shell rubber; a pigment, an inorganic filler, an organic filler, a resin filler; an additive such as a lubricant, an antioxidant, a weatherability stabilizer, a heat stabilizer, a releasing agent, an antistatic agent and a surfactant, or the like, as desired. The amount of the optional component(s) to be blended is typically about 0.01 to 10 parts by mass based on 100 parts by mass of the total amount of the aromatic polycarbonate resin and the core-shell rubber.

The method for producing the poly(meth)acrylimide resin film (including the case where the film is the above-described transparent multilayer film) is not particularly limited. Preferred examples of the production method include the methods described in JP 2015-033844 A, JP 2015-034285 A, and JP 2015-083370 A.

In forming the second hard coat, an adhesion-facilitating treatment such as a corona discharge treatment and an anchor coat formation may be performed beforehand on the surface for forming the hard coat or both surfaces of the monolayer film formed of the poly(meth)acrylimide resin or the transparent multilayer film in order to enhance the adhesion strength to the second hard coat.

The hard coat laminated film according to the various embodiments preferably includes the first hard coat, the second hard coat, the transparent resin film layer and a third hard coat in order from the surface layer side. The third hard coat formed will allow a force to curl the hard coat laminated film in one direction (hereinafter, occasionally abbreviated as a curling force) and a force to curl the hard coat laminated film in another direction to work simultaneously. Then, the occurrence of curling can be suppressed by allowing these two curling forces to be canceled to be zero. The components and the thickness of the third hard coat are not particularly limited as long as the two curling forces can be canceled. For the components and the thickness of the third hard coat, those described above for the second hard coat may be employed.

In recent years, a touch panel has been proposed which has a bilayer structure in which a touch sensor is directly provided on the back side of a display faceplate for the purpose of weight reduction of an image display device (so-called one-glass-solution). In addition, one-plastic-solution to substitute for the so-called one-glass-solution has also been proposed for the purpose of further weight reduction. In the case where the hard coat laminated film according to the various embodiments is used for the one-plastic-solution to substitute for the so-called one-glass-solution, the third hard coat formed allows the hard coat laminated film to easily have properties suitable for a printed surface.

FIG. 1 is a cross-sectional view exemplifying a hard coat laminated film according to an embodiment. A second hard coat: 2 is formed on one side of a transparent multilayer film with a first poly(meth)acrylimide resin layer (α1): 3, an aromatic polycarbonate resin layer (β): 4, and a second poly(meth)acrylimide resin layer (α2): 5 directly laminated in this order, and a first hard coat: 1 is further formed thereon. A third hard coat: 6 is formed on the other side of the transparent multilayer film.

The hard coat laminated film according to at least one embodiment may have an optional layer(s) other than the first hard coat, the second hard coat, the transparent resin film layer and the third hard coat, as desired. Examples of the optional layer include a hard coat other than the first to third hard coats, an anchor coat, a pressure-sensitive adhesive layer, a transparent electroconductive layer, a high refractive index layer, a low refractive index layer and a reflection-preventive layer.

The hard coat laminated film according to at least one embodiment has a total light transmittance of preferably 85% or more, more preferably 88% or more, and still more preferably 90% or more (measured with a turbidimeter "NDH 2000" (trade name) available from Nippon Denshoku Industries Co., Ltd. in accordance with JIS K7361-1:1997). Due to the total light transmittance being 85% or more, the hard coat laminated film according to at least one embodiment can be suitably used for a member in an image display device. A higher total light transmittance is more preferred.

When the hard coat laminated film according to at least one embodiment is desired to have high clearness like glass, the hard coat laminated film may have a haze of preferably 2.0% or less, more preferably 1.5% or less, still more preferably 1.0% or less and most preferably 0.5% or less (measured with a turbidimeter "NDH 2000" (trade name) available from Nippon Denshoku Industries Co., Ltd. in accordance with JIS K7136:2000). A lower haze is more preferred. When the haze is 2.0% or less, the hard coat laminated film according to at least one embodiment has high clearness like glass.

When the hard coat laminated film according to at least one embodiment is desired to have an antiglare function, the hard coat laminated film may have a haze of typically 3% or more and preferably 5% or more (measured with a turbidimeter "NDH 2000" (trade name) available from Nippon Denshoku Industries Co., Ltd. in accordance with JIS K7136:2000), although depending on the level of antiglare properties to be imparted. On the other hand, the haze may be typically 30% or less and preferably 25% or less, from a viewpoint of preventing a displayed image from becoming chalky.

In the hard coat laminated film according to at least one embodiment, a surface of the first hard coat has a pencil hardness of typically 3H or higher, preferably 5H or higher, more preferably 6H or higher, still more preferably 7H or higher and most preferably 9H or higher (measured with a pencil "uni" (trade name) available from Mitsubishi Pencil Co., Ltd. under conditions of a load of 750 g in accordance with JIS K5600-5-4). Due to the pencil hardness being 3H or higher or preferably 5H or higher, the hard coat laminated film according to at least one embodiment can be more suitably used for a member in an image display device. A higher pencil hardness is more preferred.

The hard coat laminated film according to at least one embodiment has a minimum bending radius of preferably 50 mm or less and more preferably 40 mm or less. Due to the minimum bending radius being preferably 50 mm or less, the hard coat laminated film according to at least one embodiment can easily be handled as a film roll, and this leads to an advantage in terms of production efficiency and the like. A smaller minimum bending radius is more preferred. Here, the minimum bending radius is a value determined by a test (x) in Examples described later. The minimum bending radius referred to herein is a bending radius immediately before the occurrence of a crack in the surface of a bending portion when a hard coat laminated film is bent, and indicates the limit against bending. Bending radius is defined in the same manner as for radius of curvature.

Figure 2:
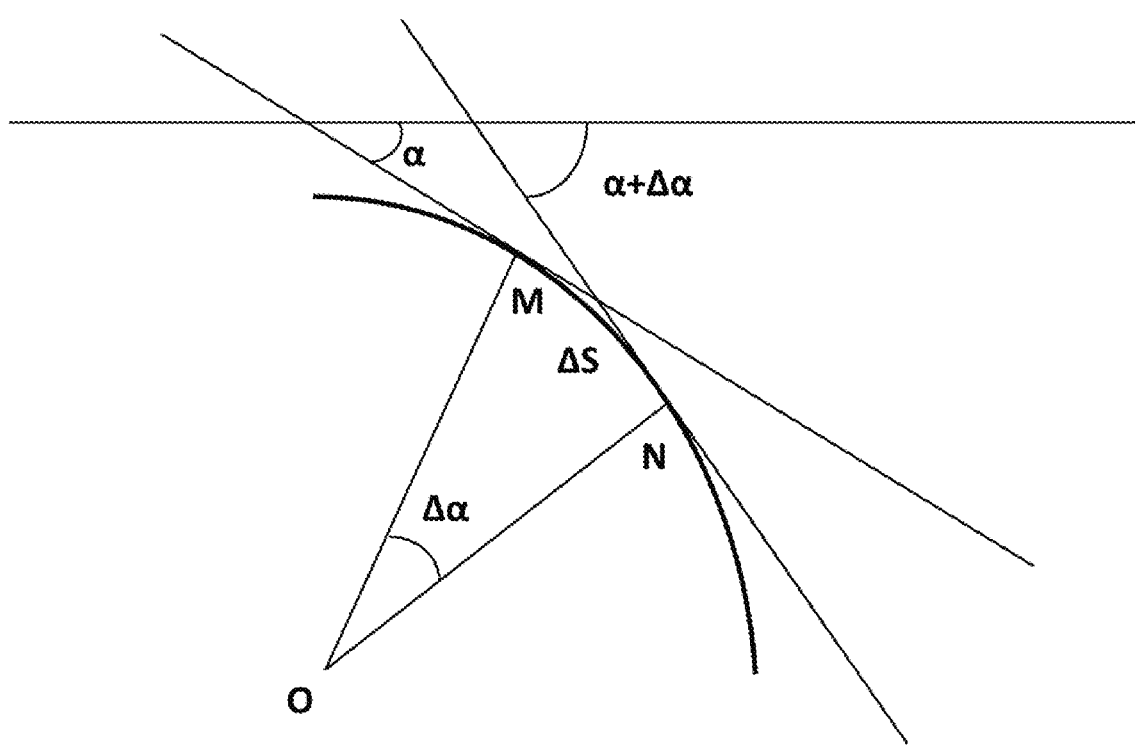
FIG. 2 is a diagram for explaining a radius of curvature.

A radius of curvature is defined as follows in reference to FIG. 2. The length from the point M to the point N in the curve is denoted as $\Delta S$; the difference between the slope of the tangent line at the point M and the slope of the tangent line at the point N as $\Delta \alpha$; and the intersection of the line which is perpendicular to the tangent line at the point M and intersects with the tangent line at the point M and the line which is perpendicular to the tangent line at the point N and intersects with the tangent line at the point N, as O. In the case where $\Delta S$ is sufficiently small, the curve from the point M to the point N can be approximated to an arc (see FIG. 2). The radius in this case is defined as the radius of curvature. Further, the radius of curvature is denoted as R. Then, $\angle MON = \Delta \alpha$. In the case where $\Delta S$ is sufficiently small, $\Delta \alpha$ is also sufficiently small and therefore $\Delta S = R\Delta \alpha$. As the result, $R = \Delta S/\Delta \alpha$.

In the hard coat laminated film according to at least one embodiment, a surface of the first hard coat has a water contact angle of preferably 100° or more, and more preferably 105° or more. In the case where the hard coat laminated film according to at least one embodiment is used for a display faceplate in a touch panel, the first hard coat will function as a touch surface. The water contact angle on the surface of the first hard coat of 100° or more enables to operate a touch panel at will by sliding fingers or a pen on the touch surface. From a viewpoint of sliding fingers or a pen at will, a higher water contact angle is more preferred. The upper limit of the water contact angle is not particularly limited and about 120° is typically adequate from a viewpoint of finger slidability. Here, the water contact angle is a value determined by a test (iv) in Examples described later.

In the hard coat laminated film according to at least one embodiment, a surface of the first hard coat has a water contact angle after 20000 reciprocating wipes with a cotton of preferably 100° or more. More preferably, the water contact angle on the first hard coat after 25000 reciprocating wipes with a cotton is 100° or more. The water contact angle after 20000 reciprocating wipes with a cotton of 100° or more enables to maintain the surface properties such as finger slidability even after repeated wipes with a handkerchief or the like. For the number of wipes with a cotton during which a water contact angle of 100° or more can be maintained, a larger number is more preferred. Here, the water contact angle after wipes with a cotton is a value determined by a test (v) in Examples described later.

In the hard coat laminated film according to at least one embodiment, steel wool resistance of the first hard coat surface is at a level at which no scratch is found preferably after 1500 reciprocating rubbings, more preferably after 1750 reciprocating rubbings, and still more preferably 2000 reciprocating rubbings with steel wool. When the steel wool resistance is at a high level, the hard coat laminated film according to at least one embodiment can be suitably used for a display faceplate in a touch panel. A higher steel wool resistance is more preferred. Here, the resistance against steel is a value determined by a test (vi) in Examples described later.

The hard coat laminated film according to at least one embodiment has a yellowness index of preferably 3 or less, more preferably 2 or less and still more preferably 1 or less (measured with a colorimeter "SolidSpec-3700" (trade name) available from Shimadzu Corporation in accordance with JIS K7105:1981). A smaller yellowness index is more preferred. Due to the yellowness index being 3 or less, the hard coat laminated film according to at least one embodiment can be suitably used for a member in an image display device.

In some embodiments, the hard coat laminated film according to at least one embodiment may have a total light transmittance of 85% or more, 88% or more, or 90% or more, and/or when the hard coat laminated film is desired to have high clearness like glass, the hard coat laminated film may have a haze of 2.0% or less, 1.5% or less, 1.0% or less, or 0.5% or less (or when the hard coat laminated film is desired to have an antiglare function, the hard coat laminated film may have a haze of 3% or more, or 5% or more, and 30% or less, or 25% or less), and/or the surface of the first hard coat may have a pencil hardness of 3H or more, 5H or more, 6H or more, 7H or more, or 9H or more, and/or the minimum bending radius may be 50 mm or less, or 40 mm or less, and/or the water contact angle on the surface of the first hard coat may be 100° or more, or 105° or more, and/or the surface of the first hard coat may have a water contact angle after 20000 reciprocating wipes with a cotton of 100° or more, or the water contact angle after 25000 reciprocating wipes with a cotton is 100° or more, and/or the steel wool resistance on the first hard coat surface may be at a level at which no scratch is found even after 1500 reciprocating rubbings, 1750 reciprocating rubbings, or 2000 reciprocating rubbings with steel wool.

Production Method

The method for producing the hard coat laminated film according to at least one embodiment can be produced by using any method without particular limitation.

In a preferred embodiment, from a viewpoint of adhesiveness between the first hard coat and the second hard coat, a production method including the following steps is exemplified: (1) coating a transparent resin film with a coating material for forming the second hard coat to form a first wet coat; (2) irradiating the first wet coat formed from the coating material for forming the second hard coat with an active energy ray so that the integrated amount of light is 1 to 230 mJ/cm$^2$, preferably 5 to 200 mJ/cm$^2$, more preferably 10 to 160 mJ/cm$^2$, still more preferably 20 to 120 mJ/cm$^2$ and most preferably 30 to 100 mJ/cm$^2$ to convert the first wet coat formed from the coating material for forming the second hard coat into a coating film in a set-to-touch state; (3) coating the coating film in a set-to-touch state formed from the coating material for forming the second hard coat with a coating material for forming the first hard coat to form a second wet coat; and (4) preheating the second wet coat formed from the coating material for forming the first hard coat to a temperature of 30 to 100° C., preferably to a temperature of 40 to 85° C., more preferably to a temperature of 50 to 75° C. followed by irradiating with an active energy ray so that the integrated amount of light is 240 to 10000 mJ/cm$^2$, preferably 320 to 5000 mJ/cm$^2$ and more preferably 360 to 2000 mJ/cm$^2$ to obtain a hard coat laminated film including the second hard coat formed from the coating material for forming the second hard coat and the first hard coat formed from the coating material for forming the first hard coat.

In the step (1), the method for forming the first wet coat from the coating material for forming the second hard coat is not particularly limited, and known web coating methods can be used. Specifically, examples of the method include roll coating, gravure coating, reverse coating, roll brushing, spray coating, air knife coating and die coating. The first wet coat formed from the coating material for forming the second hard coat, which has been provided in the step (1), becomes in a set-to-touch state or in a state with no tackiness in the step (2) so that problems in handling such as sticking do not occur even in direct contact with a web apparatus. This enables to form the second wet coat on the coating film in a set-to-touch state formed from the coating material for forming the second hard coat by using the coating material for forming the first hard coat in the next step (3).

The clause "a coating film is in a set-to-touch state (in a state with no tackiness)" referred to herein means that a coating film is in a state in which, even when the coating film directly comes into contact with a web apparatus, no problem in handling occurs.

The irradiation with an active energy ray in the step (2) is performed so that the integrated amount of light, although depending on the properties of a coating material to be used as the coating material for forming the second hard coat, is typically 1 mJ/cm$^2$ or more, preferably 5 mJ/cm$^2$ or more, more preferably 10 mJ/cm$^2$ or more, still more preferably 20 mJ/cm$^2$ or more and most preferably 30 mJ/cm$^2$ or more from a viewpoint of converting the coating film into a coating film in a set-to-touch state reliably. At the same time, the irradiation with an active energy ray in this step is performed so that the integrated amount of light is typically 230 mJ/cm$^2$ or less, preferably 200 mJ/cm$^2$ or less, more preferably 160 mJ/cm$^2$ or less, still more preferably 120 mJ/cm$^2$ or less and most preferably 100 mJ/cm$^2$ or less from a viewpoint of the adhesiveness between the first hard coat and the second hard coat. The integrated amount of light in this step may be typically 1 mJ/cm$^2$ or more and 230 mJ/cm$^2$ or less, preferably 1 mJ/cm$^2$ or more and 200 mJ/cm$^2$ or less, or 1 mJ/cm$^2$ or more and 160 mJ/cm$^2$ or less, or 1 mJ/cm$^2$ or more and 120 mJ/cm$^2$ or less, or 1 mJ/cm$^2$ or more and 100 mJ/cm$^2$ or less, or preferably 5 mJ/cm$^2$ or more and 230 mJ/cm$^2$ or less, or 5 mJ/cm$^2$ or more and 200 mJ/cm$^2$ or less, or 5 mJ/cm$^2$ or more and 160 mJ/cm$^2$ or less, or 5 mJ/cm$^2$ or more and 120 mJ/cm$^2$ or less, or 5 mJ/cm$^2$ or more and 100 mJ/cm$^2$ or less, or preferably 10 mJ/cm$^2$ or more and 230 mJ/cm$^2$ or less, or 10 mJ/cm$^2$ or more and 200 mJ/cm$^2$ or less, or 10 mJ/cm$^2$ or more and 160 mJ/cm$^2$ or less, or 10 mJ/cm$^2$ or more and 120 mJ/cm$^2$ or less, or 10 mJ/cm$^2$ or more and 100 mJ/cm$^2$ or less, or preferably 20 mJ/cm$^2$ or more and 230 mJ/cm$^2$ or less, or 20 mJ/cm$^2$ or more and 200 mJ/cm$^2$ or less, or 20 mJ/cm$^2$ or more and 160 mJ/cm$^2$ or less, or 20 mJ/cm$^2$ or more and 120 mJ/cm$^2$ or less, or 20 mJ/cm$^2$ or more and 100 mJ/cm$^2$ or less, or preferably 30 mJ/cm$^2$ or more and 230 mJ/cm$^2$ or less, or 30 mJ/cm$^2$ or more and 200 mJ/cm$^2$ or less, or 30 mJ/cm$^2$ or more and 160 mJ/cm$^2$ or less, or 30 mJ/cm$^2$ or more and 120 mJ/cm$^2$ or less, or 30 mJ/cm$^2$ or more and 100 mJ/cm$^2$ or less.

The first wet coat formed from the coating material for forming the second hard coat is preferably predried before irradiating with an active energy ray in the step (2). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

The first wet coat formed from the coating material for forming the second hard coat may be preheated to a temperature of 40 to 120° C., preferably to a temperature of 70 to 100° C. in advance of irradiating an active energy ray in the step (2). Such preheating enables to convert the coating film into a set-to-touch state reliably. The method for preheating is not particularly limited, and any method can be performed. Specific examples of the method will be explained later in the description of the step (4).

The method for forming the second wet coat formed from the coating material for forming the first hard coat in the step (3) is not particularly limited, and any known web coating method can be used. Specifically, examples of the method include roll coating, gravure coating, reverse coating, roll brushing, spray coating, air knife coating and die coating.

The second wet coat formed from the coating material for forming the first hard coat, which has been provided in the step (3), is completely cured in the step (4). Simultaneously, the coating film in a set-to-touch state formed from the coating material for forming the second hard coat is also completely cured.

The above-described method enables to enhance the adhesiveness between the first hard coat and the second hard coat, and without wishing to be bound by any theory it is presumed that the reason is that complete curing is simultaneously achieved for both hard coats by limiting the integrated amount of light in irradiating an active energy ray to an amount adequate to convert the coating film into a coating film in a set-to-touch state but inadequate to completely cure the coating film in the step (2) and setting the integrated amount of light to an amount adequate to completely cure the coating film in the step (4) for the first time.

The irradiation with an active energy ray in the step (4) is performed so that the integrated amount of light is 240 mJ/cm$^2$ or more, preferably 320 mJ/cm$^2$ or more, and more preferably 360 mJ/cm$^2$ or more from a viewpoint of completely curing the coating film and further improving the adhesiveness between the first hard coat and the second hard coat. At the same time, the irradiation with an active energy ray in this step is performed so that the integrated amount of light is 10000 mJ/cm$^2$ or less, preferably 5000 mJ/cm$^2$ or less, and more preferably 2000 mJ/cm$^2$ or less from a viewpoint of preventing the yellowing of a hard coat laminated film to be obtained and costs. The integrated amount of light in this step may be typically 240 mJ/cm$^2$ or more and 10000 mJ/cm$^2$ or less, preferably 240 mJ/cm$^2$ or more and 5000 mJ/cm$^2$ or less, or 240 mJ/cm$^2$ or more and 2000 mJ/cm$^2$ or less, or preferably 320 mJ/cm$^2$ or more and 10000 mJ/cm$^2$ or less, or 320 mJ/cm$^2$ or more and 5000 mJ/cm$^2$ or less, or 320 mJ/cm$^2$ or more and 2000 mJ/cm$^2$ or less, or preferably 360 mJ/cm$^2$ or more and 10000 mJ/cm$^2$ or less, or 360 mJ/cm$^2$ or more and 5000 mJ/cm$^2$ or less, or 360 mJ/cm$^2$ or more and 2000 mJ/cm$^2$ or less.

The second wet coat formed from the coating material for forming the first hard coat is preferably predried before irradiating with an active energy ray in the step (4). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

Figure 3:
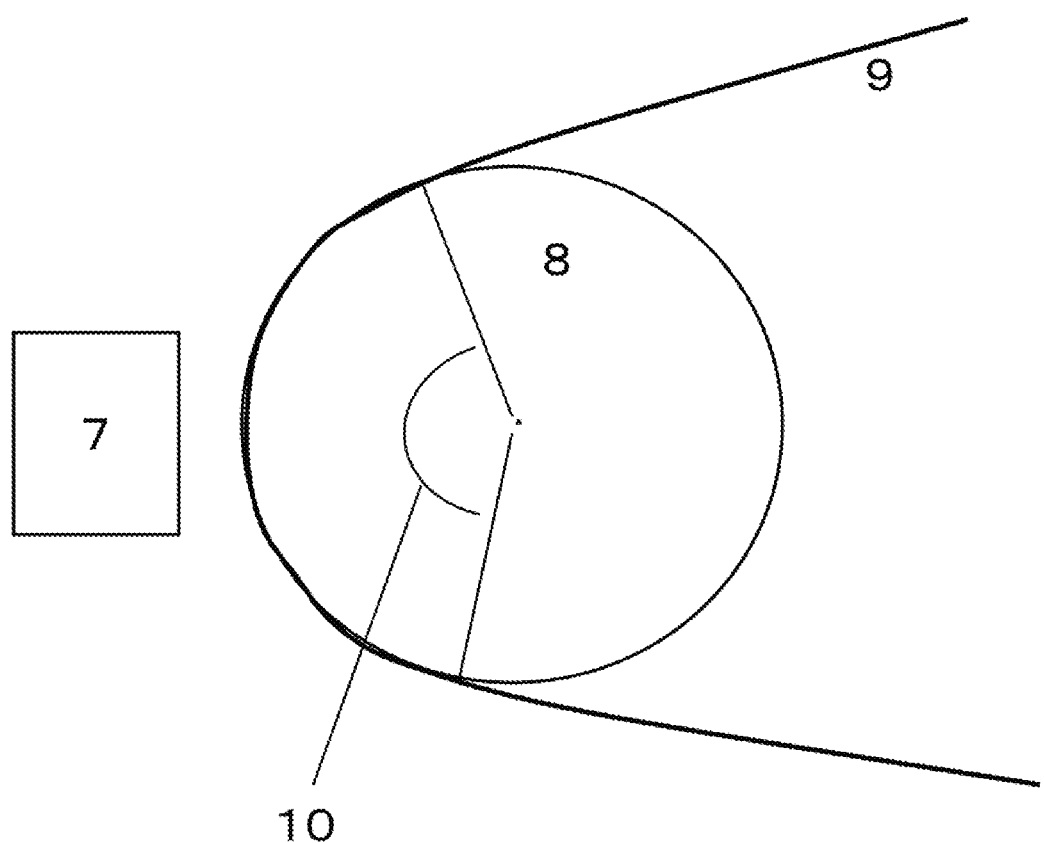
FIG. 3 is a conceptual diagram illustrating an example of a UV irradiator.

The second wet coat formed from the coating material for forming the first hard coat may be preheated to a temperature of 30 to 100° C., preferably to a temperature of 40 to 85° C. and more preferably to a temperature of 50 to 75° C. in advance of irradiating an active energy ray in the step (4) from a viewpoint of obtaining a good interlayer adhesion strength even in the case where the coating material for forming the first hard coat and the coating material for forming the second hard coat are largely different in properties. The temperature range may be preferably 30 to 85° C. or 30 to 75° C., or preferably 40 to 100° C. or 40 to 85° C. or 40 to 75° C., or preferably be 50 to 100° C. or 50 to 85° C. or 50 to 75° C. The method for preheating is not particularly limited, and any method can be used. Examples thereof include a method in which a web 9 is wrapped around a mirror-finished metal roll 8 disposed opposite to an active energy ray (UV ray) irradiator 7 as illustrated in FIG. 3 and the surface temperature of the roll is controlled to a predetermined temperature; a method in which the temperature in an irradiation furnace, which is formed by surrounding an active energy ray irradiator, is controlled to a predetermined temperature; and a combination of these methods.

An aging treatment may be performed after the step (4). This enables to stabilize the properties of the hard coat laminated film.

EXAMPLES

The various embodiments will be now described by referring to Examples, but the various embodiments are not limited to these Examples.

Measurement/Evaluation Methods for Physical Properties (i) Total Light Transmittance The total light transmittance was measured according to JIS K7361-1:1997 by using a turbidimeter "NDH2000" (trade name) of Nippon Denshoku Industries Co., Ltd.

(ii) Haze

The haze was measured according to JIS K7136:2000 by using a turbidimeter "NDH2000" (trade name) of Nippon Denshoku Industries Co., Ltd.

(iii) Yellowness Index

The yellowness index was measured according to JIS K7105:1981 by using a colorimeter "SolidSpec-3700" (trade name) available from Shimadzu Corporation.

(iv) Water Contact Angle

The water contact angle of a hard coat laminated film was measured for the surface of the first hard coat with an automatic contact angle meter "DSA 20" (trade name) available from KRUSS GmbH by using a method to determine from the width and the height of a water drop (as indicated in JIS R3257:1999).

(v) Abrasion Resistance 1 (Water Contact Angle after Wipes with Cotton)

A test piece of a hard coat laminated film was prepared in a size of 150 mm length and 50 mm width so that the machine direction of the hard coat laminated film corresponded to the longitudinal direction of the test piece, and the test piece was placed on a Gakushin-type tester in accordance with JIS L0849 so that the first hard coat of the hard coat laminated film was on the surface side. A stainless steel sheet (10 mm length, 10 mm width, 1 mm thickness) covered with a four-ply gauze (a type 1 medical gauze available from Kawamoto Corporation) was attached to a rubbing finger of the Gakushin-type tester, and the resultant was set so that the sheet face of the stainless steel sheet came into contact with the test piece and a load of 350 g was applied. After 10000 reciprocating rubbings of the surface of the first hard coat of the test piece under conditions that the moving distance of the rubbing finger was 60 mm and the speed was 1 cycle/sec, the water contact angle on the cotton-wiped portion was measured in accordance with the method in the (iv). In the case where the water contact angle was 100° or more, the operation of additionally carrying out 5000 reciprocating rubbings and then measuring the water contact angle on the cotton-wiped portion in accordance with the method in the (iv) was repeated, and evaluation was performed by using the following criteria.

A: The water contact angle was 100° or more even after 25000 cycles of reciprocation.

B: The water contact angle was 100° or more after 20000 cycles but the water contact angle was less than 100° after 25000 cycles of reciprocation.

C: The water contact angle was 100° or more after 15000 cycles of reciprocation but the water contact angle was less than 100° after 20000 cycles of reciprocation.

D: The water contact angle was 100° or more after 10000 cycles of reciprocation but the water contact angle was less than 100° after 15000 cycles of reciprocation.

E: The water contact angle was less than 100° after 10000 cycles of reciprocation.

(vi) Abrasion Resistance 2 (Steel Wool Resistance)

A hard coat laminated film was placed on a Gakushin-type tester in accordance with JIS L0849 so that the first hard coat was on the surface side. A steel wool of #0000 was subsequently attached to a rubbing finger of the Gakushin-type tester and a load of 500 g was then applied. After 1000 reciprocating rubbings of the surface of the test piece, the rubbed portion was visually observed. In the case where no scratch was found, the operation of additionally carrying out 250 reciprocating rubbings and then visually observing the rubbed portion was repeated, and evaluation was performed by using the following criteria.

A: No scratches were found even after 2000 cycles of reciprocation.

B: No scratches were found after 1750 cycles of reciprocation but scratches were found after 2000 cycles of reciprocation.

C: No scratches were found after 1500 cycles of reciprocation but scratches were found after 1750 cycles of reciprocation.

D: No scratches were found after 1250 cycles of reciprocation but scratches were found after 1500 cycles of reciprocation.

E: No scratches were found after 1000 cycles of reciprocation but scratches were found after 1250 cycles of reciprocation.

F: Scratches were found after 1000 cycles of reciprocation.

(vii) Pencil Hardness

The pencil hardness of a hard coat laminated film was measured for the surface of the first hard coat according to JIS K5600-5-4 by using a pencil "UNI" (trade name) of Mitsubishi Pencil Co., Ltd under the condition of a load of 750 g.

(viii) Surface Smoothness (Surface Appearance)

The surface (i.e., each of both surfaces) of a hard coat laminated film was visually observed while irradiating with a fluorescent light from various incident angles, and evaluation was performed by using the following criteria.

◎ (very good): No undulations or flaws were found on the surface. No cloudiness was perceived even when the surface was seen through with a light irradiated closely.

○ (good): A portion with a little cloudiness was found when the surface was seen through with a light irradiated closely.

Δ (slightly poor): Undulations or flaws were found on the surface in a small quantity when the surface was looked at closely. Further, cloudiness was perceived.

x (poor): Undulations or flaws were found on the surface in a large quantity. Further, cloudiness was clearly perceived.

(ix) Cross-Cut Test (Adhesiveness)

In accordance with JIS K5600-5-6:1999, a square lattice pattern cut consisting of 100 cells (1 cell=1 mm×1 mm) was provided on the surface of the first hard coat of a hard coat laminated film. Thereafter, a tape for adhesion tests was attached on the square lattice pattern cut and rubbed with fingers and then peeled off. The criteria for evaluation were in accordance with Table 1 in the above standard of JIS.

Classification 0: The edges of the cuts were completely smooth; none of the squares of the lattice was detached.

Classification 1: Detachment of small flakes of the coating was seen at the intersections of the cuts. A cross-cut area of not greater than 5% was affected.

Classification 2: The coating flaked along the edges and/or at the intersections of the cuts. A cross-cut area of greater than 5%, but not greater than 15%, was affected.

Classification 3: The coating flaked along the edges of the cuts partly or wholly to a large degree, and/or it flaked partly or wholly on different parts of the squares. A cross-cut area of greater than 15%, but not greater than 35%, was affected.

Classification 4: The coating flaked along the edges of the cuts partly or wholly to a large degree and/or some squares detached partly or wholly. A cross-cut area of greater than 35%, but not greater than 65%, was affected.

Classification 5: This criterion was defined as the case where the degree of flaking was greater than that in Classification 4.

(x) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminated film so that the first hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" referred to herein has the same meaning as the term regarding a shaping jig in the B method defined in Paragraph 18.2 in JIS K6902:2007.

(xi) Cutting Processability (Condition of Curved Cutting-Processed Line)

A hard coat laminated film was provided with a cut hole in true circle with a diameter of 2 mm and a cut hole in true circle with a diameter of 0.5 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 2 mm was observed for the cut edge surface visually or with a microscope (100×) and evaluation was performed by using the following criteria. Similarly, the cut hole with a diameter of 0.5 mm was observed for the cut edge surface visually or with a microscope (100×) and evaluation was performed by using the following criteria. The result of the former case and the result of the latter case were listed in this order in the tables below.

◎: (very good): No crack or burr was found even in microscopic observation.

○ (good): No crack was found even in microscopic observation; however, a burr was found in microscopic observation.

Δ (slightly poor) No crack was visually found. However, a crack was found in microscopic observation.

x (poor): A crack was found even in visual observation.

(xii) Shrinkage-Starting Temperature (Dimensional Stability Against Heat)

A temperature-test piece length curve was determined in accordance with JIS K7197:1991. Using this curve, an inflection point at which an increasing (expanding) trend in the test piece length shifted to a decreasing (shrinking) trend (a temperature at which the test piece length became maximum) on the lowest temperature side within a range of 20° C. to the glass transition temperature of a raw material resin was estimated as a shrinkage-starting temperature. The thermomechanical analyzer (TMA) "EXSTAR 6100 (trade name)" available from Seiko Instruments Inc. was used for the measurement. A test piece was prepared in a size of 20 mm length and 10 mm width so that the machine direction (MD) of the film corresponded to the longitudinal direction of the test piece. Conditioning of the test piece was performed at a temperature of 23° C.±2° C. and a relative humidity of 50±5% for 24 hours, and conditioning at the maximum temperature to be measured was not performed in order to evaluate dimensional stability as the physical property value of a film. The distance between chucks and the tensile load were set to 10 mm and 4.0 mN/mm$^2$, respectively. The temperature program was one in which the temperature was retained at a temperature of 20° C. for 3 minutes and thereafter increased to a temperature of 300° C. at a temperature increase rate of 5° C./min.

Raw Materials Used (A) Polyfunctional (meth)acrylate:
  (A-1) A mixture "Biscoat #802" (trade name) of a tripentaerythritol acrylate, a dipentaerythritol acrylate, a monopentaerythritol acrylate, and a polypentaerythritol acrylate available from Osaka Organic Chemical Industry Ltd.: the content of tripentaerythritol acrylate of 60% by mass
  (A-2) Pentaerythritol triacrylate (trifunctional)
  (A-3) Dipentaerythritol hexaacrylate (hexafunctional)
(B) Water repellent:
  (B-1) An acryloyl group-containing fluoropolyether water repellent "KY-1203" (trade name) available from Shin-Etsu Chemical Co., Ltd.: solid content 20% by mass
  (B-2) A methacryloyl group-containing fluoropolyether water repellent "FOMBLIN MT70" (trade name) available from Solvay S.A.: solid content 70% by mass
(C) Silane coupling agent:
  (C-1) N-2-(aminoethyl)-3-aminopropylmethyldimethoxysilane "KBM-602" (trade name) available from Shin-Etsu Chemical Co., Ltd.
  (C-2) N-2-(aminoethyl)-3-aminopropyltrimethoxysilane "KBM-603" (trade name) available from Shin-Etsu Chemical Co., Ltd.
  (C-3) 3-aminopropyltrimethoxysilane "KBM-903" (trade name) available from Shin-Etsu Chemical Co., Ltd.
  (C-4) 3-mercaptopropylmethyldimethoxysilane "KBM-802" (trade name) available from Shin-Etsu Chemical Co., Ltd.
  (C-5) 3-glycidoxypropyltrimethoxysilane "KBM-403" (trade name) available from Shin-Etsu Chemical Co., Ltd.
(D) Inorganic fine particles having an average particle diameter of 1 to 300 nm:
  (D-1) Silica fine particles having an average particle diameter of 20 nm the surface of which has been treated with a silane coupling agent having a vinyl group
(E) Leveling agent:
  (E-1) A silicone-acrylic copolymer leveling agent "DISPARLON NSH-8430HF" (trade name) available from Kusumoto Chemicals, Ltd.: solid content 10% by mass
  (E-2) A silicone-acrylic copolymer leveling agent "BYK-3550" (trade name) available from Big Chemy Japan KK: solid content 52% by mass
  (E-3) An acrylic polymer leveling agent "BYK-399" (trade name) available from Big Chemy Japan KK: solid content 100% by mass
  (E-4) A silicone leveling agent "DISPARLON LS-480" (trade name) available from Kusumoto Chemicals, Ltd.: solid content 100% by mass
(F) Optional component:
  (F-1) The phenyl ketone photopolymerization initiator (1-hydroxycyclohexyl phenyl ketone) "SB-PI714" (trade name) available from Shuang Bang Industrial Corp.
  (F-2) 1-methoxy-2-propanol
(H1) Coating material for forming first hard coat:
  (H1-1) A coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (F-1) and 100 parts by mass of the (F-2). The formation is shown in Table 1. Note that values in terms of solid content are listed for the (B-1) and the (B-2) in the table.
  (H1-2 to H1-15) Each coating material was obtained in the same way as in the (H1-1) except that the components and their ratio were changed as shown in Table 1 or Table 2. Note that values in terms of solid content are listed for the components (B-1) and (B-2) in the table.
(H1') Reference coating material for forming first hard coat:
  (H1'-1 to H1'-5) Each coating material was obtained in the same way as in the (H1-1) except that the components and their ratio were changed as shown in Table 1 or Table 2. Note that values in terms of solid content are listed for the (B-1) and the (B-2) in the table.

TABLE 1

Formulations (1) of coating material for forming first hard coat

| Component (parts by mass) | Coating material for forming first hard coat | | | | | | | | | |
|---|---|---|---|---|---|---|---|---|---|---|
| | H1-1 | H1-2 | H1-3 | H1-4 | H1'-1 | H1'-2 | H1-5 | H1-6 | H1-7 | H1'-3 |
| A-1 | 100 | 75 | 60 | 40 | — | 100 | 100 | 100 | 100 | 100 |
| A-3 | — | 25 | 40 | 60 | 100 | — | — | — | — | — |
| B-1 | 0.40 | 0.40 | 0.40 | 0.40 | 0.40 | — | 0.080 | 0.80 | 2.0 | 8.0 |
| B-2 | 0.042 | 0.042 | 0.042 | 0.042 | 0.042 | — | 0.0084 | 0.084 | 0.21 | 0.84 |
| B-3 | — | — | — | — | — | — | — | — | — | — |
| C-1 | 0.5 | 0.5 | 0.5 | 0.5 | 0.5 | 0.5 | 0.5 | 0.5 | 0.5 | 0.5 |
| C-2 | — | — | — | — | — | — | — | — | — | — |
| C-3 | — | — | — | — | — | — | — | — | — | — |
| C-4 | — | — | — | — | — | — | — | — | — | — |
| C-5 | — | — | — | — | — | — | — | — | — | — |

TABLE 1-continued

Formulations (1) of coating material for forming first hard coat

| Component (parts by mass) | Coating material for forming first hard coat | | | | | | | | | |
|---|---|---|---|---|---|---|---|---|---|---|
| | H1-1 | H1-2 | H1-3 | H1-4 | H1'-1 | H1'-2 | H1-5 | H1-6 | H1-7 | H1'-3 |
| D-1 | — | — | — | — | — | — | — | — | — | — |
| F-1 | 4 | 4 | 4 | 4 | 4 | 4 | 4 | 4 | 4 | 4 |
| F-2 | 100 | 100 | 100 | 100 | 100 | 100 | 100 | 100 | 100 | 80 |

TABLE 2

Formulations (2) of coating material for forming first hard coat

| Component (parts by mass) | Coating material for forming first hard coat | | | | | | | | | |
|---|---|---|---|---|---|---|---|---|---|---|
| | H1'-4 | H1'-5 | H1-8 | H1-9 | H1-10 | H1-11 | H1-12 | H1-13 | H1-14 | H1-15 |
| A-1 | 100 | 100 | 100 | 100 | 100 | 100 | 100 | 100 | 100 | 100 |
| A-3 | — | — | — | — | — | — | — | — | — | — |
| B-1 | 0.40 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 | 0.042 |
| B-3 | — | — | — | — | — | — | — | — | — | — |
| C-1 | 0.5 | — | 0.01 | 0.1 | 1 | 5 | — | — | — | — |
| C-2 | — | — | — | — | — | — | 0.5 | — | — | — |
| C-3 | — | — | — | — | — | — | — | 0.5 | — | — |
| C-4 | — | — | — | — | — | — | — | — | 0.5 | — |
| C-5 | — | — | — | — | — | — | — | — | — | 0.5 |
| D-1 | 20 | — | — | — | — | — | — | — | — | — |
| F-1 | 4 | 4 | 4 | 4 | 4 | 4 | 4 | 4 | 4 | 4 |
| F-2 | 130 | 100 | 100 | 100 | 100 | 105 | 100 | 100 | 100 | 100 |

(H2) Coating material for forming second hard coat:
(H2-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1) and 200 parts by mass of the (F-2). The formation is shown in Table 3. Note that values in terms of solid content are listed for the (E-1) in the table.
(H2-2 to H2-12) Each coating material was obtained in the same way as in the (H2-1) except that the components and their ratio were changed as shown in Table 3 or Table 4. Note that values in terms of solid content are listed for the component (E) in the table.
(H2') Reference coating material for forming second hard coat:
(H2'-1 to H2'-3) Each coating material was obtained in the same way as in the (H2-1) except that the components and their ratio were changed as shown in Table 4. Note that values in terms of solid content are listed for the component (E) in the table.

TABLE 3

Formulations (1) of coating material for forming second hard coat

| Component (parts by mass) | Coating material for forming second hard coat | | | | | | |
|---|---|---|---|---|---|---|---|
| | H2-1 | H2-2 | H2-3 | H2-4 | H2-5 | H2-6 | H2-7 |
| A-2 | 100 | 100 | 100 | 100 | 100 | 100 | 100 |
| D-1 | 140 | 140 | 140 | 140 | 140 | 140 | 140 |
| E-1 | 0.2 | — | 0.1 | 0.4 | 0.6 | 1.5 | — |
| E-2 | — | — | — | — | — | — | 0.2 |
| E-3 | — | — | — | — | — | — | — |
| E-4 | — | — | — | — | — | — | — |
| F-1 | 17 | 17 | 17 | 17 | 17 | 17 | 17 |
| F-2 | 200 | 200 | 200 | 200 | 200 | 200 | 200 |

TABLE 4

Formulations (2) of coating material for forming second hard coat

| Component (parts by mass) | Coating material for forming second hard coat | | | | | | | |
|---|---|---|---|---|---|---|---|---|
| | H2-8 | H2-9 | H2-10 | H2-11 | H2-12 | H2'-1 | H2'-2 | H2'-3 |
| A-2 | 100 | 100 | 100 | 100 | 100 | 100 | 100 | 100 |
| D-1 | 140 | 140 | 140 | 80 | 200 | 30 | 400 | — |
| E-1 | — | — | — | 0.2 | 0.2 | 0.2 | 0.2 | 0.2 |
| E-2 | 0.4 | — | — | — | — | — | — | — |
| E-3 | — | 0.3 | — | — | — | — | — | — |
| E-4 | — | — | 0.3 | — | — | — | — | — |
| F-1 | 17 | 17 | 17 | 17 | 17 | 17 | 17 | 17 |
| F-2 | 200 | 200 | 200 | 155 | 250 | 120 | 420 | 100 |

Figure 4:
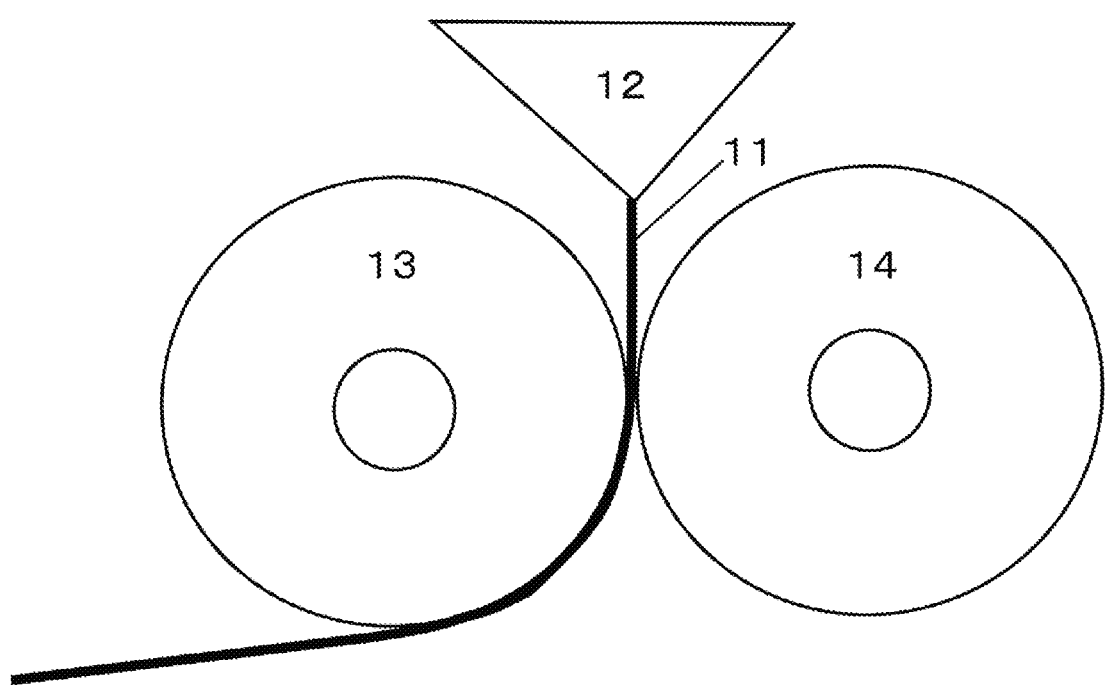
FIG. 4 is a conceptual diagram of a film forming apparatus used in Examples.

(P) Transparent resin film:
(P-1) Using an apparatus (FIG. 4) equipped with a two-component/three-layer multimanifold-type coextrusion T-die 12 and a winder having a mechanism to pressurize a melted film 11 with a first mirror-finished roll 13 (i.e. a roll to hold a melted film and deliver the melted film to a subsequent transfer roll) and a second mirror-finished roll 14, a two-component/three-layer multilayer resin film in which both outer layers (α1 layer and α2 layer) were formed of the poly(meth)acrylimide "PLEXIMID TT50" (trade name) available from Evonik Industry AG and the intermediate layer (β layer) was formed of an aromatic polycarbonate "CALIBRE 301-4" (trade name) available from Sumika Styron Polycarbonate Limited was continuously coextruded from the coextrusion T-die, and the coextruded product was fed between the rotating first mirror-finished roll and the rotating second mirror-finished roll so that the α1 layer was on the first mirror-finished roll side, and pressurized. As a result, a transparent resin film having a total thickness of 250 μm was obtained in which the layer thickness of the α1 layer was 80 μm, the layer thickness of the β layer was 90 μm and the layer thickness of the α2 layer was 80 μm. Regarding the conditions set for this operation, the temperature of the T-die, the temperature of the first mirror-finished roll, the temperature of the second mirror-finished roll and the wind-up speed were set to 300° C., 130° C., 120° C. and 6.5 m/min, respectively.

(P-2) A transparent resin film was obtained in the same way as in the (P-1) except that the layer thickness ratio was changed so that the layer thickness of the α1 layer, the layer thickness of the β layer and the layer thickness of the α2 layer were 60 μm, 130 μm and 60 μm, respectively.

(P-3) A transparent resin film was obtained in the same way as in the (P-1) except that the layer thickness ratio was changed so that the layer thickness of the α1 layer, the layer thickness of the β layer and the layer thickness of the α2 layer were 40 μm, 170 μm and 40 μm, respectively.

(P-4) A biaxially oriented polyethylene terephthalate film "DIAFOIL" (trade name) available from Mitsubishi Plastics, Inc.: thickness 250 μm.

(P-5) An acrylic resin film "TECHNOLLOY S001G" (trade name) available from Sumitomo Chemical Co., Ltd.: thickness 250 μm.

(P-6) Using an apparatus equipped with a monolayer T-die and a winder having a mechanism to pressurize a melted film with a first mirror-finished roll (i.e. a roll to hold a melted film and deliver the melted film to a subsequent transfer roll) and a second mirror-finished roll, an aromatic polycarbonate "CALIBRE 301-4" (trade name) available from Sumika Styron Polycarbonate Limited was continuously extruded from the T-die, and the extruded product was fed between the rotating first mirror-finished roll and the rotating second mirror-finished roll, and pressurized. As a result, a transparent resin film having a total thickness of 250 μm was obtained. Regarding the conditions set for this operation, the temperature of the T-die, the temperature of the first mirror-finished roll, the temperature of the second mirror-finished roll and the wind-up speed were set to 320° C., 140° C., 120° C. and 5.6 m/min, respectively.

Example 1

Both surfaces of the (P-1) were subjected to a corona discharge treatment. Both surfaces had a wetting index of 64 mN/m. Subsequently, the surface on the α1 layer side was coated with the (H2-1) by using a die-type applicator so that the wet coat thickness was 40 μm (thickness after curing: 22 μm). Next, the resultant was passed in a drying furnace with the inner temperature set to 90° C. at a line speed such that the time required to pass through from the inlet to the outlet was 1 minute, and then treated with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 90° C. and the integrated amount of light was 80 mJ/cm². In FIG. 3, reference numeral 9 denotes a web, and reference numeral 10 denotes a holding angle. As a result, the wet coat formed of the (H2-1) became a coating film in a set-to-touch state. Subsequently, the coating film in a set-to-touch state formed of the (H2-1) was coated with the (H1-1) by using a die-type applicator so that the wet coat thickness was 4 μm (thickness after curing: 2 μm). Next, the resultant was passed in a drying furnace with the inner temperature set to 80° C. at a line speed such that the time required to pass through from the inlet to the outlet was 1 minute, and then treated to form a first hard coat and a second hard coat with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 60° C. and the integrated amount of light was 480 mJ/cm². Subsequently, a third hard coat was formed on the surface on the α2 layer side with the same coating material as in forming the second hard coat (e.g., the (H2-1) in Example 1) by using a die-type applicator so that the thickness after curing was 22 μm, and as a result a hard coat laminated film was obtained. The tests (i) to (xii) were performed for this hard coat laminated film. The results of these tests are shown in Table 5 (and Table 12).

Examples 2 to 15, Examples 1C to 5C

Each hard coat laminated film was prepared and measurement/evaluation of the physical properties was performed totally in the same way as in Example 1 except that the coating material shown in any one of Tables 5 to 8 was used instead of the (H1-1). The results are shown in any one of Tables 5 to 8.

Examples 16 to 26, Examples 6C to 8C

Each hard coat laminated film was prepared and measurement/evaluation of the physical properties was performed totally in the same way as in Example 1 except that the coating material shown in any one of Tables 8 to 10 was used instead of the (H2-1). The results are shown in any one of Tables 8 to 10.

Examples 27 to 31

Each hard coat laminated film was prepared and measurement/evaluation of the physical properties was performed totally in the same way as in Example 1 except that the transparent resin film shown in Table 10 was used instead of the (P-1). The results are shown in Table 10.

Examples 32 to 35

Each hard coat laminated film was prepared and measurement/evaluation of the physical properties was performed totally in the same way as in Example 1 except that the thickness after curing of the first hard coat was changed as shown in Table 11. The results are shown in Table 11. In Tables, "HC" stands for abbreviation of hard coat (also in the following table).

Examples 36 to 39

Each hard coat laminated film was prepared and measurement/evaluation of the physical properties was performed totally in the same way as in Example 1 except that the thickness after curing of the second hard coat was changed as shown in Table 11 or Table 12 and the thickness after curing of the third hard coat was changed to the same thickness after curing as the second hard coat. The results are shown in Table 11 and Table 12.

Examples 40 to 54

Each hard coat laminated film was prepared and measurement/evaluation of the physical properties was performed in the same way as in Example 1 except that the production conditions of the hard coat laminated films were changed as shown in any one of Tables 12 to 14. The results are shown in any one of Tables 12 to 14.

TABLE 5

Measurement/evaluation results of physical properties of hard coat laminated film

|  |  | Example 1 | Example 2 | Example 3 | Example 4 | Example 1C | Example 2C |
|---|---|---|---|---|---|---|---|
| Components | Coating material for first hard coat | H1-1 | H1-2 | H1-3 | H1-4 | H1'-1 | H1'-2 |
|  | Coating material for second hard coat | H2-1 | H2-1 | H2-1 | H2-1 | H2-1 | H2-1 |
|  | Transparent resin film | P-1 | P-1 | P-1 | P-1 | P-1 | P-1 |
| Evaluation results | Total light transmittance % | 90.9 | 90.9 | 90.9 | 90.9 | 90.9 | 90.9 |
|  | Haze % | 0.2 | 0.2 | 0.2 | 0.2 | 0.2 | 0.1 |
|  | Yellowness index | 0.3 | 0.3 | 0.3 | 0.3 | 0.3 | 0.3 |
|  | Water contact angle deg | 116 | 116 | 116 | 116 | 116 | 72.1 |
|  | Abrasion resistance 1 | A | A | A | A | A | E |
|  | Abrasion resistance 2 | A | B | C | D | E | D |
|  | Pencil hardness | 9H | 9H | 8H | 7H | 7H | 6H |
|  | Surface smoothness | ◎ | ◎ | ◎ | ◎ | ◎ | ◎ |
|  | Cross-cut test | Class 0 | Class 0 | Class 0 | Class 0 | Class 0 | Class 0 |
|  | Minimum bending radius mm | 40 | 40 | 35 | 30 | 30 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 6

Measurement/evaluation results of physical properties of hard coat laminated film

|  |  | Example 5 | Example 6 | Example 7 | Example 3C | Example 4C | Example 5C |
|---|---|---|---|---|---|---|---|
| Components | Coating material for first hard coat | H1-5 | H1-6 | H1-7 | H1'-3 | H1'-4 | H1'-5 |
|  | Coating material for second hard coat | H2-1 | H2-1 | H2-1 | H2-1 | H2-1 | H2-1 |
|  | Transparent resin film | P-1 | P-1 | P-1 | P-1 | P-1 | P-1 |
| Evaluation results | Total light transmittance % | 90.9 | 90.8 | 90.4 | 89.8 | 90.1 | 90.9 |
|  | Haze % | 0.1 | 0.3 | 1.3 | 3.5 | 0.3 | 0.2 |
|  | Yellowness index | 0.3 | 0.3 | 0.3 | 0.3 | 0.3 | 0.3 |
|  | Water contact angle deg | 115 | 116 | 118 | 119 | 116 | 116 |
|  | Abrasion resistance 1 | B | A | A | A | E | A |
|  | Abrasion resistance 2 | B | A | A | A | F | A |
|  | Pencil hardness | 9H | 9H | 9H | 9H | 9H | 9H |
|  | Surface smoothness | ◎ | ◎ | ◎ | ◎ | ◎ | ◎ |
|  | Cross-cut test | Class 0 | Class 0 | Class 0 | Class 0 | Class 0 | Class 4 |
|  | Minimum bending radius mm | 40 | 40 | 40 | 40 | 40 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 7

Measurement/evaluation results of physical properties of hard coat laminated film

|  |  | Example 8 | Example 9 | Example 10 | Example 11 | Example 12 | Example 13 | Example 14 |
|---|---|---|---|---|---|---|---|---|
| Components | Coating material for first hard coat | H1-8 | H1-9 | H1-10 | H1-11 | H1-12 | H1-13 | H1-14 |
|  | Coating material for second hard coat | H2-1 | H2-1 | H2-1 | H2-1 | H2-1 | H2-1 | H2-1 |
|  | Transparent resin film | P-1 | P-1 | P-1 | P-1 | P-1 | P-1 | P-1 |
| Evaluation results | Total light transmittance % | 90.9 | 90.9 | 90.9 | 90.9 | 90.9 | 90.9 | 90.9 |
|  | Haze % | 0.2 | 0.2 | 0.2 | 0.2 | 0.2 | 0.2 | 0.2 |
|  | Yellowness index | 0.3 | 0.3 | 0.3 | 0.3 | 0.3 | 0.3 | 0.3 |
|  | Water contact angle deg | 116 | 116 | 116 | 116 | 116 | 116 | 116 |

TABLE 7-continued

Measurement/evaluation results of physical properties of hard coat laminated film

|  | Example 8 | Example 9 | Example 10 | Example 11 | Example 12 | Example 13 | Example 14 |
|---|---|---|---|---|---|---|---|
| Abrasion resistance 1 | A | A | A | A | A | A | A |
| Abrasion resistance 2 | A | A | A | A | A | A | A |
| Pencil hardness | 9H | 9H | 9H | 9H | 9H | 9H | 9H |
| Surface smoothness | ◎ | ◎ | ◎ | ◎ | ◎ | ◎ | ◎ |
| Cross-cut test | Class 1 | Class 0 | Class 0 | Class 0 | Class 0 | Class 0 | Class 0 |
| Minimum bending radius mm | 40 | 40 | 40 | 40 | 40 | 40 | 40 |
| Cutting processability | ◎-◎ | ◎-◎ | ◎-◎ | ◎-◎ | ◎-◎ | ◎-◎ | ◎-◎ |
| Shrinkage-starting temperature ° C. | 140 | 140 | 140 | 140 | 140 | 140 | 140 |

TABLE 8

Measurement/evaluation results of physical properties of hard coat laminated film

|  |  | Example 15 | Example 16 | Example 17 | Example 18 | Example 19 | Example 20 | Example 21 |
|---|---|---|---|---|---|---|---|---|
| Components | Coating material for first hard coat | H1-15 | H1-1 | H1-1 | H1-1 | H1-1 | H1-1 | H1-1 |
|  | Coating material for second hard coat | H2-1 | H2-2 | H2-3 | H2-4 | H2-5 | H2-6 | H2-7 |
|  | Transparent resin film | P-1 | P-1 | P-1 | P-1 | P-1 | P-1 | P-1 |
| Evaluation results | Total light transmittance % | 90.9 | 90.9 | 90.9 | 90.9 | 90.9 | 90.9 | 90.9 |
|  | Haze % | 0.2 | 0.3 | 0.2 | 0.2 | 0.2 | 0.5 | 0.2 |
|  | Yellowness index | 0.3 | 0.3 | 0.3 | 0.3 | 0.3 | 0.3 | 0.3 |
|  | Water contact angle deg | 116 | 116 | 116 | 116 | 116 | 116 | 116 |
|  | Abrasion resistance 1 | A | B | A | A | A | A | A |
|  | Abrasion resistance 2 | A | B | A | A | A | A | A |
|  | Pencil hardness | 9H | 9H | 9H | 9H | 9H | 9H | 9H |
|  | Surface smoothness | ◎ | ○ | ○ | ◎ | ◎ | ◎ | ◎ |
|  | Cross-cut test | Class 3 | Class 0 | Class 0 | Class 0 | Class 0 | Class 2 | Class 0 |
|  | Minimum bending radius mm | 30 | 40 | 40 | 40 | 40 | 40 | 40 |
|  | Cutting processability | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 | 140 |

TABLE 9

Measurement/evaluation results of physical properties of hard coat laminated film

|  |  | Example 22 | Example 23 | Example 24 | Example 25 | Example 26 | Example 6C |
|---|---|---|---|---|---|---|---|
| Components | Coating material for first hard coat | H1-1 | H1-1 | H1-1 | H1-1 | H1-1 | H1-1 |
|  | Coating material for second hard coat | H2-8 | H2-9 | H2-10 | H2-11 | H2-12 | H2'-1 |
|  | Transparent resin film | P-1 | P-1 | P-1 | P-1 | P-1 | P-1 |
| Evaluation results | Total light transmittance % | 90.9 | 90.9 | 90.9 | 91.1 | 90.0 | 91.1 |
|  | Haze % | 0.2 | 0.5 | 0.5 | 0.2 | 0.6 | 0.1 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Pencil hardness | 9H | 9H | 9H | 8H | 9H | 5H |
|  | Surface smoothness | ◎ | ○ | ◎ | ◎ | ◎ | ◎ |
|  | Cross-cut test | Class 0 | Class 0 | Class 2 | Class 0 | Class 0 | Class 0 |
|  | Minimum bending radius mm | 40 | 40 | 40 | 30 | 50 | 30 |
|  | Cutting processability | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 |

TABLE 10

Measurement/evaluation results of physical properties of hard coat laminated film

|  |  | Example 7C | Example 8C | Example 27 | Example 28 | Example 29 | Example 30 | Example 31 |
|---|---|---|---|---|---|---|---|---|
| Components | Coating material for first hard coat | H1-1 | H1-1 | H1-1 | H1-1 | H1-1 | H1-1 | H1-1 |
|  | Coating material for second hard coat | H2'-2 | H2'-3 | H2-1 | H2-1 | H2-1 | H2-1 | H2-1 |
|  | Transparent resin film | P-1 | P-1 | P-2 | P-3 | P-4 | P-5 | P-6 |

TABLE 10-continued

Measurement/evaluation results of physical properties of hard coat laminated film

|  |  | Example 7C | Example 8C | Example 27 | Example 28 | Example 29 | Example 30 | Example 31 |
|---|---|---|---|---|---|---|---|---|
| Evaluation results | Total light transmittance % | 88.0 | 91.5 | 90.9 | 90.9 | 90.1 | 90.9 | 90.6 |
|  | Haze % | 3.5 | 0.1 | 0.2 | 0.2 | 0.3 | 0.3 | 0.3 |
|  | Yellowness index | 0.3 | 0.3 | 0.3 | 0.3 | 0.3 | 0.3 | 0.4 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Pencil hardness | 9H | 3H | 8H | 7H | 5H | 7H | 3H |
|  | Surface smoothness | ◎ | ◎ | ◎ | ◎ | ◎ | ◎ | ◎ |
|  | Cross-cut test | Class 0 | Class 0 | Class 0 | Class 0 | Class 0 | Class 0 | Class 0 |
|  | Minimum bending radius mm | 60 | 30 | 40 | 40 | 40 | 50 | 40 |
|  | Cutting processability | ◎-○ | ◎-○ | ◎-○ | ◎-○ | ◎-○ | ◎-○ | ◎-○ |
|  | Shrinkage-starting temperature ° C. | 140 | 140 | 140 | 140 | 70 | 100 | 130 |

TABLE 11

Measurement/evaluation results of physical properties of hard coat laminated film

|  |  | Example 32 | Example 33 | Example 34 | Example 35 | Example 36 | Example 37 |
|---|---|---|---|---|---|---|---|
| First HC | Thickness μm | 0.5 | 1 | 3 | 5 | 2 | 2 |
|  | Preheating in irradiation ° C. | 60 | 60 | 60 | 60 | 60 | 60 |
|  | Integrated amount of light mJ/cm2 | 480 | 480 | 480 | 480 | 480 | 480 |
| Second HC | Thickness μm | 22 | 22 | 22 | 22 | 15 | 18 |
|  | Preheating in irradiation ° C. | 90 | 90 | 90 | 90 | 90 | 90 |
|  | Integrated amount of light mJ/cm2 | 80 | 80 | 80 | 80 | 80 | 80 |
| Evaluation results | Total light transmittance % | 90.9 | 90.9 | 90.9 | 90.9 | 91.1 | 90.8 |
|  | Haze % | 0.2 | 0.2 | 0.4 | 0.9 | 0.2 | 0.2 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | B | A | A | A | A | A |
|  | Abrasion resistance 2 | B | A | A | A | A | A |
|  | Pencil hardness | 7H | 9H | 9H | 9H | 7H | 9H |
|  | Surface smoothness | ◎ | ◎ | ◎ | ◎ | ◎ | ◎ |
|  | Cross-cut test | Class 0 | Class 0 | Class 0 | Class 2 | Class 0 | Class 0 |
|  | Minimum bending radius mm | 40 | 40 | 40 | 50 | 25 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 12

Measurement/evaluation results of physical properties of hard coat laminated film

|  |  | Example 38 | Example 39 | Example 40 | Example 1 | Example 41 | Example 42 |
|---|---|---|---|---|---|---|---|
| First HC | Thickness μm | 2 | 2 | 2 | 2 | 2 | 2 |
|  | Preheating in irradiation ° C. | 60 | 60 | 60 | 60 | 60 | 60 |
|  | Integrated amount of light mJ/cm2 | 480 | 480 | 480 | 480 | 480 | 480 |
| Second HC | Thickness μm | 25 | 35 | 22 | 22 | 22 | 22 |
|  | Preheating in irradiation ° C. | 90 | 90 | 90 | 90 | 90 | 90 |
|  | Integrated amount of light mJ/cm2 | 80 | 80 | 30 | 80 | 120 | 160 |
| Evaluation results | Total light transmittance % | 90.5 | 90.0 | 90.9 | 90.9 | 90.9 | 90.9 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Pencil hardness | 9H | 9H | 9H | 9H | 9H | 9H |
|  | Surface smoothness | ◎ | ◎ | ◎ | ◎ | ◎ | ◎ |
|  | Cross-cut test | Class 0 | Class 0 | Class 0 | Class 0 | Class 0 | Class 1 |
|  | Minimum bending radius mm | 45 | 75 | 40 | 40 | 40 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 13

Measurement/evaluation results of physical properties of hard coat laminated film

|  |  | Example 43 | Example 44 | Example 45 | Example 46 | Example 47 | Example 48 |
|---|---|---|---|---|---|---|---|
| First HC | Thickness μm | 2 | 2 | 2 | 2 | 2 | 2 |
|  | Preheating in irradiation ° C. | 60 | 60 | 40 | 80 | 40 | 80 |
|  | Integrated amount of light mJ/cm2 | 480 | 480 | 480 | 480 | 480 | 480 |
| Second HC | Thickness μm | 22 | 22 | 22 | 22 | 22 | 22 |
|  | Preheating in irradiation ° C. | 90 | 90 | 90 | 90 | 90 | 90 |
|  | Integrated amount of light mJ/cm2 | 230 | 300 | 80 | 80 | 120 | 120 |
| Evaluation results | Total light transmittance % | 90.9 | 90.9 | 90.9 | 90.9 | 90.9 | 90.9 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 116 | 116 | 110 | 116 | 110 | 116 |
|  | Abrasion resistance 1 | A | A | A | A | A | A |
|  | Abrasion resistance 2 | A | A | A | A | A | A |
|  | Pencil hardness | 9H | 9H | 9H | 9H | 9H | 9H |
|  | Surface smoothness | ◎ | ◎ | ◎ | ◎ | ◎ | ◎ |
|  | Cross-cut test | Class 3 | Class 4 | Class 0 | Class 0 | Class 1 | Class 1 |
|  | Minimum bending radius mm | 40 | 40 | 40 | 40 | 40 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 14

Measurement/evaluation results of physical properties of hard coat laminated film

|  |  | Example 49 | Example 50 | Example 51 | Example 52 | Example 53 | Example 54 |
|---|---|---|---|---|---|---|---|
| First HC | Thickness μm | 2 | 2 | 2 | 2 | 2 | 2 |
|  | Preheating in irradiation ° C. | 25 | 40 | 80 | 110 | 40 | 80 |
|  | Integrated amount of light mJ/cm2 | 480 | 480 | 480 | 480 | 480 | 480 |
| Second HC | Thickness μm | 22 | 22 | 22 | 22 | 22 | 22 |
|  | Preheating in irradiation ° C. | 90 | 90 | 90 | 90 | 90 | 90 |
|  | Integrated amount of light mJ/cm2 | 160 | 160 | 160 | 160 | 230 | 230 |
| Evaluation results | Total light transmittance % | 90.9 | 90.9 | 90.9 | 90.9 | 90.9 | 90.9 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 110 | 110 | 116 | 110 | 110 | 116 |
|  | Abrasion resistance 1 | A | A | A | A | A | A |
|  | Abrasion resistance 2 | A | A | A | A | A | A |
|  | Pencil hardness | 9H | 9H | 9H | 9H | 9H | 9H |
|  | Surface smoothness | ◎ | ◎ | ◎ | ◎ | ◎ | ◎ |
|  | Cross-cut test | Class 5 | Class 2 | Class 2 | Class 5 | Class 3 | Class 3 |
|  | Minimum bending radius mm | 40 | 40 | 40 | 40 | 40 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

The hard coat laminated film according to various embodiments is excellent in transparency, color tone, abrasion resistance, surface hardness, and surface appearance. Therefore, the hard coat laminated film can be suitably used for a display faceplate in an image display device with a touch panel function.

REFERENCE SIGNS LIST

1: First hard coat
2: Second hard coat
3: First poly(meth)acrylimide resin layer (α1)
4: Aromatic polycarbonate resin layer (β)
5: Second poly(meth)acrylimide resin layer (α2)
6: Third hard coat
7: UV irradiator
8: Mirror-finished metal roll
9: Web
10: Holding angle
11: Molten resin film
12: T-die
13: First mirror-finished roll
14: Second mirror-finished roll

The invention claimed is:

1. A hard coat laminated film, comprising:
a first hard coat,
a second hard coat, and
a transparent resin film layer in order from a surface layer side,
wherein the first hard coat comprises
(A) 100 parts by mass of a polyfunctional (meth)acrylate comprising 20% by mass or more of a tripentaerythritol acrylate;
(B) 0.01 to 7 parts by mass of a water repellent; and
(C) 0.01 to 10 parts by mass of a silane coupling agent,
wherein the first hard coat being formed from a coating material not containing inorganic particles; and
wherein the second hard coat comprising (A') 100 parts by mass of a polyfunctional (meth)acrylate; and
wherein (D) 50 to 300 parts by mass of inorganic fine particles having an average particle diameter of 1 to 300 nm.

2. The hard coat laminated film according to claim 1, wherein the polyfunctional (meth)acrylate comprising 20% by mass or more of a tripentaerythritol acrylate of component (A) is a mixture of a tripentaerythritol acrylate; and
one or more species selected from the group consisting of a dipentaerythritol acrylate, a monopentaerythritol acrylate, and a polypentaerythritol acrylate.

3. The hard coat laminated film according to claim 1, wherein the (C) silane coupling agent comprises one or more species selected from the group consisting of a silane coupling agent having an amino group and a silane coupling agent having a mercapto group.

4. The hard coat laminated film according to claim 1, wherein the (B) water repellent comprises a (meth)acryloyl group-containing fluoropolyether water repellent.

5. The hard coat laminated film according to claim 1, wherein the coating material for forming the second hard coat further comprises (E) 0.01 to 1 part by mass of a leveling agent.

6. The hard coat laminated film according to claim 1, wherein a thickness of the first hard coat is 0.5 to 5 μm.

7. The hard coat laminated film according to claim 1, wherein a thickness of the second hard coat is 10 to 30 μm.

8. The hard coat laminated film according to claim 1, wherein the transparent resin film is a transparent multilayer film with a first poly(meth)acrylimide resin layer (α1); an aromatic polycarbonate resin layer (β); and a second poly(meth)acrylimide resin layer (α2) directly laminated in this order.

9. Use of the hard coat laminated film according to claim 1 for a member in an image display device.

10. An image display device comprising the hard coat laminated film according to claim 1.

11. The hard coat laminated film according to claim 1, wherein the polyfunctional (meth)acrylate comprising 20% by mass or more of a tripentaerythritol acrylate of component (A) is a polyfunctional (meth)acrylate comprising 40% by mass or more of a tripentaerythritol acrylate.

12. The hard coat laminated film according to claim 1, wherein the polyfunctional (meth)acrylate comprising 20% by mass or more of a tripentaerythritol acrylate of component (A) is a mixture of a tripentaerythritol acrylate, a dipentaerythritol acrylate, a monopentaerythritol acrylate, and a polypentaerythritol acrylate.

13. The hard coat laminated film according to claim 1, wherein the (D) inorganic fine particles having an average particle diameter of 1 to 300 nm are silica fine particles.

14. A method for producing the hard coat laminated film according to claim 1, comprising the steps of:
(1) coating the transparent resin film with the coating material for forming the second hard coat to form a first wet coat;
(2) irradiating the first wet coat formed from a coating material for forming the second hard coat with an active energy ray so that the integrated amount of light is 1 to 230 mJ/cm$^2$ to convert the first wet coat formed from the coating material for forming the second hard coat into a coat in a set-to-touch state;
(3) coating the coat in a set-to-touch state formed from the coating material for forming the second hard coat with a coating material for forming the first hard coat to form a second wet coat; and
(4) preheating the second wet coat formed from the coating material for forming the first hard coat to a temperature of 30 to 100° C. followed by irradiating with an active energy ray so that the integrated amount of light is 240 to 10000 mJ/cm$^2$ to obtain a hard coat laminated film comprising the second hard coat formed from the coating material for forming the second hard coat and the first hard coat formed from the coating material for forming the first hard coat.

* * * * *